(12) United States Patent
Nakamura

(10) Patent No.: US 9,042,658 B2
(45) Date of Patent: May 26, 2015

(54) IMAGE PROCESSING DEVICE AND PIXEL INTERPOLATION METHOD

(75) Inventor: Satoshi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 13/976,517

(22) PCT Filed: Jan. 11, 2012

(86) PCT No.: PCT/JP2012/050883
§ 371 (c)(1),
(2), (4) Date: Jun. 27, 2013

(87) PCT Pub. No.: WO2012/099137
PCT Pub. Date: Jul. 26, 2012

(65) Prior Publication Data
US 2013/0272615 A1    Oct. 17, 2013

(30) Foreign Application Priority Data

Jan. 19, 2011 (JP) .................................. 2011-008653

(51) Int. Cl.
*G06K 9/32* (2006.01)
*G06T 3/40* (2006.01)
(Continued)

(52) U.S. Cl.
CPC ............... *G06T 3/4007* (2013.01); *G06T 5/002* (2013.01); *H04N 1/401* (2013.01); *H04N 1/4097* (2013.01)

(58) Field of Classification Search
CPC ......... G06T 3/4007; G06T 3/40; G06T 5/002; H04N 1/4097; H04N 1/401
USPC ......... 382/162, 195, 170, 163, 254, 298, 300; 348/222.1, 453, 241, 251, 256, 243, 348/645, 242, 607, 515, 224.1, 223.1, 348/231.99, E5.031, E11.02, E5.078, 348/E5.024, E9.053, E9.042, E5.022, 348/E9.052
See application file for complete search history.

(56) References Cited

U.S. PATENT DOCUMENTS 5,097,518 A * 3/1992 Scott et al. .................... 382/298
5,113,455 A * 5/1992 Scott ............................ 382/298
(Continued)

FOREIGN PATENT DOCUMENTS

JP  2004-072528  3/2004
JP  2007-087210  4/2007
JP  4330164      9/2009

OTHER PUBLICATIONS

International Search Report Issued on Mar. 27, 2012 in PCT/JP2012/050883 filed on Jan. 11, 2012.
(Continued)

*Primary Examiner* — Sheela Chawan
(74) *Attorney, Agent, or Firm* — IPUSA, PLLC

(57) ABSTRACT

An image processing device that generates a pixel value of a pixel and interpolates the pixel with the pixel value, the image processing device including: a periodicity determining unit that determines whether an area including the pixel is a periodic area; a boundary determining unit that determines whether the pixel belongs to the periodic area or a non-periodic area; a first pixel value generating unit that generates a first pixel value; a second pixel value generating unit that generates a second pixel value; a control unit that determines whether the first pixel value generating unit is to be used or the second pixel value generating unit is to be used, based on determination results of the periodicity determining unit and the boundary determining unit; a pixel value inputting unit that inputs one of the first pixel value and the second pixel value to the pixel.

15 Claims, 13 Drawing Sheets

(51) Int. Cl.
*G06T 5/00* (2006.01)
*H04N 1/401* (2006.01)
*H04N 1/409* (2006.01)

(56) References Cited

U.S. PATENT DOCUMENTS

| | | | |
|---|---|---|---|
| 7,783,122 B2 * | 8/2010 | Wu et al. | 382/254 |
| 8,553,293 B2 * | 10/2013 | Tabata | 358/447 |
| 8,736,700 B2 * | 5/2014 | Cote et al. | 348/222.1 |
| 2002/0015162 A1 | 2/2002 | Hoshii et al. | |
| 2007/0064995 A1 | 3/2007 | Oaki et al. | |
| 2009/0091809 A1 | 4/2009 | Hyuga et al. | |
| 2010/0290092 A1 | 11/2010 | Tabata | |

OTHER PUBLICATIONS

Extended European search report dated Jul. 9, 2014.

* cited by examiner

IMAGE PROCESSING DEVICE AND PIXEL INTERPOLATION METHOD

TECHNICAL FIELD

The present invention relates to a device which performs a pixel interpolation process to interpolate a pixel which does not have a pixel value or a pixel which has an incorrect value, a pixel interpolation method performed by the device, and a computer readable program that realizes the pixel interpolation method.

BACKGROUND ART

Scanner devices which read images using optical units include scanner devices using contact image sensors (CIS) and scanner devices using charge coupled devices (CCD). For the scanner device using CIS, a manuscript may be required to be attached to a reading surface. The scanner device using CIS is not able to read a three-dimensional manuscript. However, compared with the scanner device using CCD, thickness of the main body for the scanner device using CIS can be reduced and the price is lower. Furthermore, for the scanner device using CIS, a technique to reduce noise which tends to appear on a read image has been improved. Thus the scanner device using CIS has been widely used. For example, CIS is used for reading the reverse side in an image reading device having a single-pass duplex scanning function.

CIS uses RGB light-emitting diodes (LED) as light sources. The RGB light beams are rapidly switched and the light beams from the manuscript are input to an imaging device (CMOS image sensor) through a lens. In response to this, the CMOS image sensor converts the input light beams into voltage values on a pixel-by-pixel basis, and outputs.

The scanner device using CIS adopts a contact image sensor method in which a manuscript is close contact with the sensor by a roller, and the manuscript is read on a line-by-line basis. A reading part is formed by arranging plural short sensors in their longitudinal directions. This is because it is difficult to manufacture a single long CIS. However, in this case, constant gaps are provided between the sensors. Image signals are not obtained at the gaps. Consequently, defects on the image signal occur.

Further, in a scanner device, an image signal may be missed or a read image signal may indicate an incorrect value, when a sensor reading the image signal is malfunctioning, or when an obstructing material exists, such as a smear on a contact glass on the light path on which a manuscript is to be set.

There has been a problem that an image quality is lowered by the missing pixels in the read image or by the existence of pixels having incorrect pixel values in the read image. In view of this problem, conventionally a technique has been known in which pixel values of missing pixels or incorrect pixel values are estimated using pixel values around the pixels, and the pixel values of missing pixels or the incorrect pixel values are replaced by the estimated values.

For example, a linear interpolation method using pixel values of the pixels surrounding the objective pixels, a polynomial interpolation method or a spline interpolation method using two or more functions can be considered. The interpolation method based on a linear interpolation is suitable for interpolation of a portion at which the density variation is small. However, the interpolation method based on linear interpolation is not suitable for an interpolation of a portion at which the density variation is large, such as a halftone dot area.

The interpolation methods based on a polynomial interpolation or a spline interpolation can estimate the pixel values with high precision for a digital photograph and the like, for which the sampling period for sampling the image is sufficiently shorter than a fluctuating period of a pattern of the image. However, for a halftone dot image, since resolution of the image is not sufficient in comparison with the number of lines of the halftone dot, a sampling period is not sufficiently shorter than a fluctuating period. Thus, with this interpolation method, there are many cases in which an original pattern is not correctly reconstructed.

Therefore, in order to resolve the problem of the interpolation methods, a method using pattern matching has been proposed. In this method, it is expected that a high frequency component, which cannot be reconstructed using the interpolation methods, can be reconstructed using similar patterns in the vicinity of the interpolation pixels.

However, in general, in pattern matching, since a wider range of information is used compared to the interpolation methods, an optimum solution can be obtained for a pattern which is used as a reference, however, the optimum solution is not always optimum for the interpolation pixels. This problem occurs, because, when a similar pattern is searched for during pattern matching, a pattern which includes plural small differences from the reference pattern as a whole and a pattern which coincides with the reference pattern in major portions, but including a small portion that is greatly different from the corresponding portion in the reference pattern are not distinguished.

Especially, for a case in which information is eccentrically-located at a specific pixel, such as a halftone dot area in which there are many lines, a selection method for selecting a similar pattern affects greatly on an interpolation result. Further, in a low density halftone dot area, since a percentage of pixels belonging to the background is relatively high, a similar pattern may be detected in the background area, which is not the halftone dot area, or, conversely, a similar pattern may not be detected.

Thus, when performing an interpolation, it may be necessary to select an interpolation method depending on a characteristic of an area to which an interpolation pixel belongs. Therefore, in order to accurately estimate a pixel value of the interpolation pixel, a device has been proposed such that, when a position of the interpolation pixel is within a halftone dot area, a pattern which is similar to the pattern, including the interpolation pixel, is searched for in the image, and the device determines a pixel value of the interpolation pixel to be a pixel value of a pixel corresponding to the interpolation pixel in the most similar pattern (cf. Patent Document 1 (Japanese Registered Patent No. 4330164)).

The device determines whether the position of a pixel to be interpolated corresponding to a connected portion of contact image sensors are within a halftone dot area or within a non-halftone dot area based on image data read by an image reading sensor. When the position of the pixel to be interpolated is within the non-halftone dot area, the device generates pixel data for the pixel to be interpolated based on a linear interpolation, and interpolates the position of the pixel to be interpolated with the pixel data. On the other hand, when the position is within the halftone dot area, the device generates pixel data for the pixel to be interpolated based on a pattern matching, and interpolates the position of the pixel to be interpolated with the pixel data.

At this time, within an image area in the vicinity of the position of the pixel to be interpolated, a standard block including the pixel to be interpolated and plural reference blocks having the same size as the standard block and not including the pixel to be interpolated are defined. Based on the pixel data within the standard block and the pixel data within each reference block, a correlation value between the standard block and the corresponding reference block is calculated. In the pixel data included in the reference block, which has the highest correlation with the standard block, pixel data of the pixel which is corresponding to the pixel to be interpolated within the standard block are determined as the pixel data of the pixel to be interpolated.

However, with this interpolation method, there is a problem that for an image in which pixel values minutely vary, the interpolation can be performed with high precision, but for an image in which pixel values significantly vary, the degree of precision of the interpolation is severely degraded. Further, the determination of whether the position of the interpolation pixel is in the halftone dot area or in the non-halftone dot area is performed based on a global characteristic. Therefore, in a case in which a global characteristic and a local characteristic contradict, for example, there is a problem that the interpolation fails for a boundary line between a halftone dot area and a background area.

This is because, the determination of whether the position of the interpolation pixel is in the halftone dot area or in the non-halftone dot area is based on a periodicity of the pixel values in a line including the interpolation pixel. Further, there is a case such that when the position of the interpolation pixel is viewed as a relatively large area, such as one line, the area has a periodicity, but when the position of the interpolation pixel is viewed as a narrow area, such as the close vicinity of the interpolation pixel, the area does not have any periodicity. In such a case, it may be erroneously determined that the area has a periodicity. Incidentally, a non-halftone dot area in the vicinity of a halftone dot area and a non-halftone dot area sandwiched between two halftone dot areas tend to be erroneously determined. When the area is erroneously determined, a flat area outside the halftone dot area is interpolated as the halftone dot area. Consequently, an incorrect pixel value is generated.

Therefore, it has been desired to provide a device and a method such that, when a pixel value of an interpolation pixel is obtained, interpolation methods are switched depending on a global characteristic and a local characteristic, so that a higher precision pixel interpolation is realized, compared to a conventional one.

SUMMARY OF THE INVENTION

Means for Solving the Problems

In one aspect, there is provided an image processing device that generates a pixel value of a pixel placed at a predetermined position and interpolates the pixel with the pixel value, the image processing device comprising: a periodicity determining unit that determines whether an area including the pixel is a periodic area which includes a periodic variation of pixel values; a boundary determining unit that defines one or more reference areas, the one or more reference areas being in the vicinity of the pixel, when the periodicity determining unit determines that the area is the periodic area, and configured to determine whether the pixel belongs to the periodic area or a non-periodic area, based on image characteristics of the one or more reference areas; a first pixel value generating unit that generates a first pixel value of the pixel using a first interpolation method; a second pixel value generating unit that generates a second pixel value of the pixel using a second interpolation method, the second interpolation method being different from the first interpolation method; a control unit that determines whether the first pixel value generating unit is to be used to generate the first pixel value or the second pixel value generating unit is to be used to generate the second pixel value, based on a determination result of the periodicity determining unit and a determination result of the boundary determining unit; and a pixel value inputting unit that inputs one of the first pixel value generated by the first pixel value generating unit and the second pixel value generated by the second pixel value generating unit to the pixel, the one of the first pixel value and the second pixel value being determined by the control unit.

In another aspect, there is provided a pixel interpolation method in which a pixel value of a pixel placed at a predetermined position is generated by an image processing device and the pixel is interpolated with the pixel value, the method including: a periodicity determining step for determining whether an image area including the pixel is a periodic area which includes a periodic variation of a pixel value; a boundary determining step for defining one or more reference areas, the one or more reference areas being in the vicinity of the pixel, when the periodicity determining unit determines that the area is the periodic area, and for determining whether the pixel belongs to the periodic area or a non-periodic area, based on image characteristics of the one or more reference areas; a determining step for determining, based on a determination result of the periodicity determining step and a determination result of the boundary determining step, whether a first pixel value generating unit is to be used to generate a first pixel value for the pixel or a second pixel value generating unit is to be used to generate a second pixel value for the pixel, wherein the first pixel value generating unit is included in the image processing device and generates the first pixel value for the pixel using a first interpolation method, and the second pixel value generating unit is included in the image processing device and generates the second pixel value for the pixel using a second interpolation method; and an inputting step for inputting one of the first pixel value generated by the first pixel value generating unit and the second pixel value generated by the second pixel value generating unit to the pixel, the one of the first pixel value and the second pixel value being determined by the determining step.

DESCRIPTION OF THE REFERENCE NUMERALS

Figure 1:
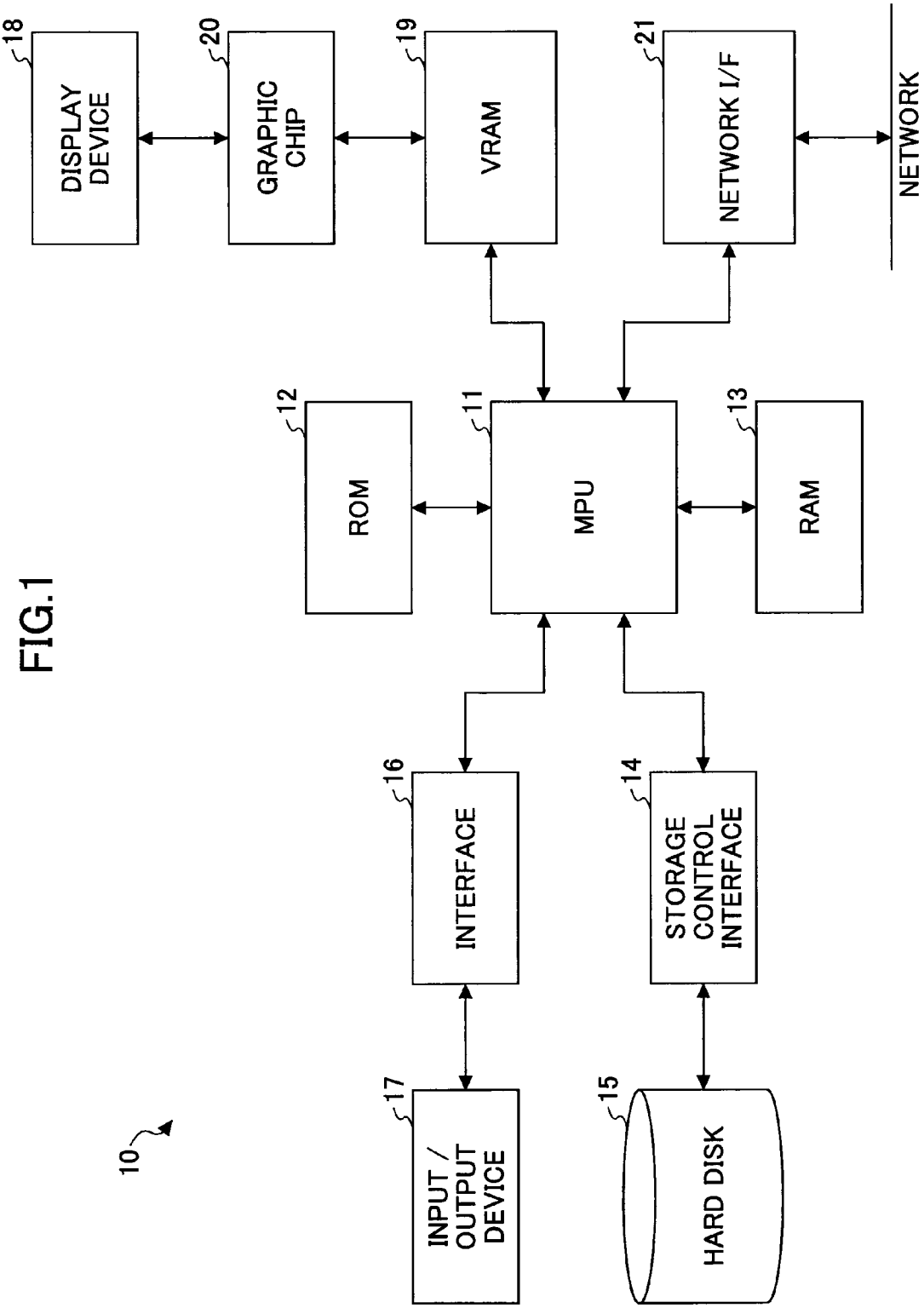
FIG. 1 is a diagram exemplifying a hardware configuration of an image processing device of the present invention.

10 Image processing device
11 MPU
12 ROM
13 RAM
14 Storage control interface
15 Hard disk
16 Interface
17 Input/output device
18 Display device
19 VRAM
20 Graphic chip
21 Network I/F
30, 50, 60 Periodicity determining unit
31, 51, 61 Boundary determining unit
32, 52, 62 First pixel value generating unit
33, 53, 63 Second pixel value generating unit
34, 54, 64 Control unit
35, 55, 65 Pixel value inputting unit
40 Pixel (which does not have a pixel value)
56, 66 Validity verification unit
67 Third pixel value generating unit

MODE FOR CARRYING OUT THE INVENTION

An image processing device of the present invention is connected to a scanner device for reading an image directly through a cable, or through a network. The scanner device uses a CIS. An image read by the scanner device includes pixels having missing pixel values and pixels having incorrect pixel values. Therefore, the image processing device generates pixel values for the pixels and performs a process to interpolate the pixels with the generated pixel values.

Here, for a gray scale image in which one pixel is represented by 8 bits, a pixel vale for black is 0 and a pixel value for white is 255. For a color image, one pixel is represented by RGB, where each color of RGB is represented by 8 bits. A pixel value includes a red value, a green value, and a blue value, each of the red value, the green value, and the blue value takes a value from 0 to 255. When all values are 0, the pixel represents black. When all values are 255, the pixel represents white.

The image processing device includes, for performing a pixel interpolation process, a storage device in which a program for executing the process is stored, such as a PC, a work station, a server, or a MFP, a processor for reading out and executing the program, and an interface for connecting to the scanner device or the network.

Specifically, as shown in FIG. 1, for example, the image processing device includes, as a processor, a micro processor unit (MPU) 11, as storage devices, a Read Only Memory (ROM) 12 which is a non-volatile memory for storing a Basic Input Output System (BIOS) or a firmware, and a Random Access Memory (RAM) 13 for providing an execution memory space which enables the MPU 11 to process programs.

The MPU 11 is connected to a storage control interface 14, which is one of interfaces, through an internal bus. The MPU 11 accesses a hard disk 15, which is one of storage devices connected to the storage control interface 14, and performs reading, executing, and writing of various types of applications or data. As the storage control interface 14, an interface which manages input and output of a hard disk 15 based on a standard, such as Integrated Device Electronics (IDE), At Attachment (ATA), Serial ATA, or UltraATA can be used. The MPU 11 controls a serial or parallel interface 16, such as a Universal Serial Bus (USB) or IEEE1394, through the internal bus. The MPU 11 communicates with an input/output device 17, such as a keyboard, a mouse, or a printer. The MPU 11 can accept an input from a user.

Further, the image processing device 10 may include a Video RAM (VRAM) 19 which processes a video signal and displays it to the display device 18, in response to a command from the MPU 11, a graphic chip 20, and a network I/F 21 to be connected to a network for communicating with other devices through the network. The VRAM 19 is a RAM used as a storage device for video displaying, with the display device 18. The graphic chip 20 is an integrated circuit for performing an image data process.

When the MPU 11 reads a program stored in a storage device, such as the ROM 12, the hard disk 15, another NV-RAM not shown in the figures, or an SD card, and when the MPU 11 expands the program in the memory area of the RAM 13, the image processing device 10 can realize processes described later under a suitable Operating System (OS). The image processing device 10 can cause the MPU 11 to function as a unit to realize each process. As an OS, Windows (Registered Trademark), UNIX (Registered Trademark), LINUX (Registered Trademark) and the like can be used. Here, the image processing device 10 is not limited to the above described PC and the like, and the image processing device 10 can be configured to be an Application Specific Integrated Circuit (ASIC) in which circuits for plural functions are integrated for a specific application.

Figure 2:
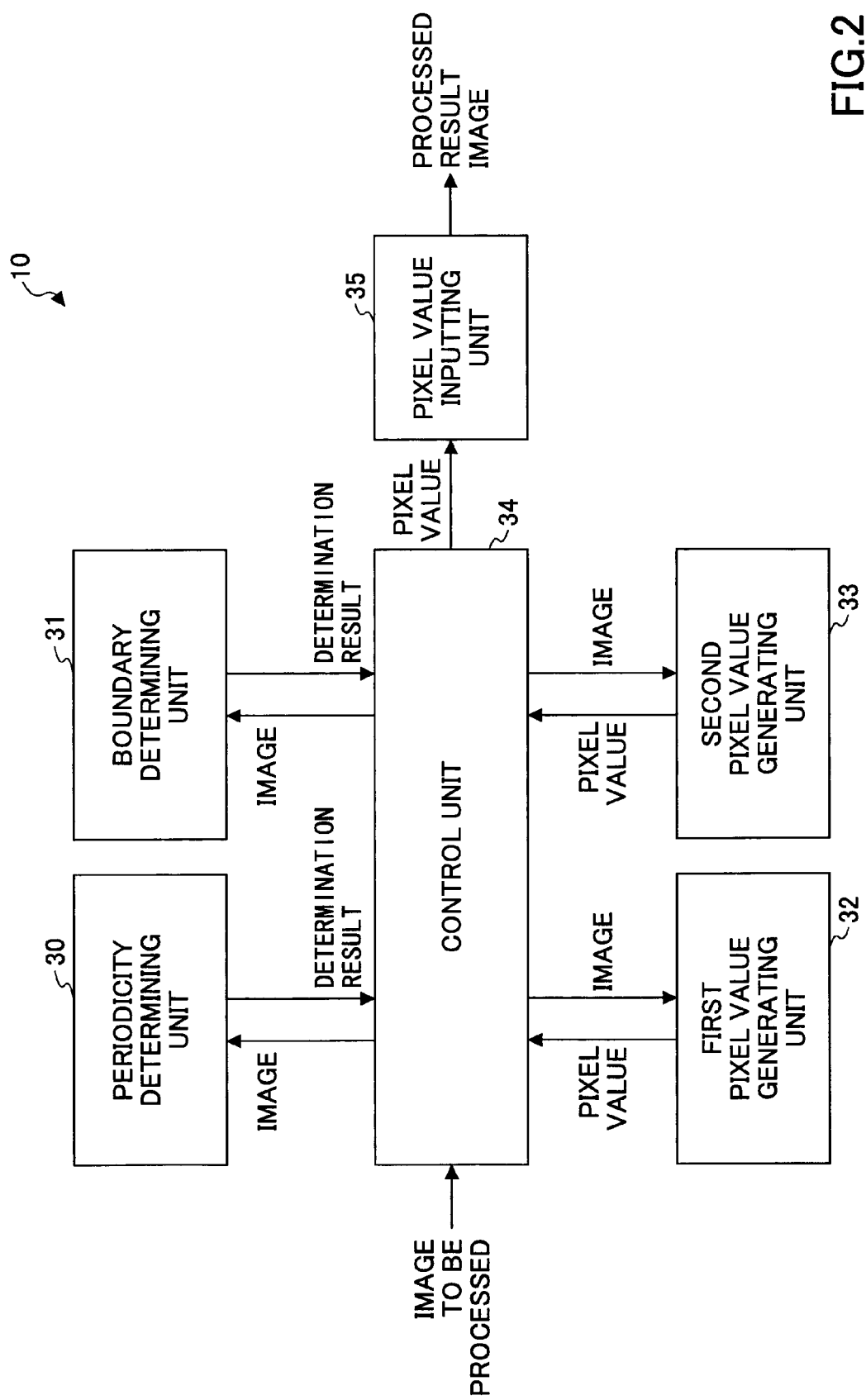
FIG. 2 is a functional block diagram illustrating a first embodiment of the image processing device.

FIG. 2 is a functional block diagram showing a first embodiment of the image processing device of the present invention. As described above, the image processing device 10 can realize each function, when the MPU 11, which is a processor, reads and processes the program stored in the storage device, such as the ROM 12 or the hard disk 15. Namely, the image processing device 10 includes a periodicity determining unit 30, a boundary determining unit 31, a first pixel value generating unit 32, a second pixel value generating unit 33, a control unit 34 and a pixel value inputting unit 35. It is not shown in FIG. 2, but the image processing device 10 may further include a pixel setting unit for setting an interpolation pixel.

Firstly, the image processing device 10 detects an interpolation pixel to which a pixel value is to be interpolated by the above described pixel setting unit within an image to be processed. A position of the interpolation pixel may be detected by a user in advance, or the device can sequentially detect its position. For example, the position can be represented by a coordinate (a, b), where the coordinate of the lower left-hand corner is set to a reference coordinate (0, 0), a is a pixel number to the right in a horizontal direction, and b is a pixel number up in a vertical direction.

As methods for the image processing device 10 to detect the interpolation pixel, for example, a method in which each pixel is checked whether the pixel has a predetermined brightness and color and the interpolation pixel is detected, a method in which the size of a shifted amount from the correct value, when a known image is read, is evaluated and the interpolation pixel is detected, and a method in which a position where a periodicity in the horizontal direction or the vertical direction is discontinuous is detected, and the pixel placed at the position is detected as the interpolation pixel, can be considered. The interpolation pixel can be an isolated point, or a line segment in which points are continued. The interpolation pixels can be a line segment, since a gap is continuously formed in a sub-scanning direction in which the imaging device moves, and a gap may include a line segment in which points are continued.

Figure 3:
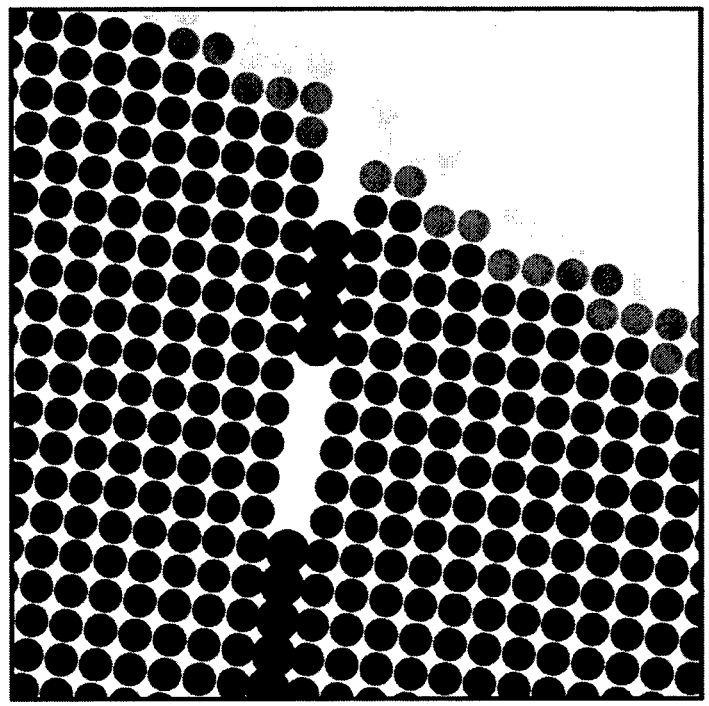
FIG. 3 is a diagram exemplifying an image including pixels to be interpolated.

As an image including interpolation pixels, as shown in FIG. 3, an image in which a vertical line occurs in a halftone dot image in which black dots having almost the same size are almost regularly arranged can be considered. The vertical line includes a portion in which dots are missing and a portion in which dots are larger compared to dots in the surrounding area, as the portions cross the central portion of the image. In the case of the image, since the dots are evenly spaced apart, the dots have a periodicity, but the periodicity is discontinuous at the portion of the vertical line. Therefore, by detecting positions at which the vertical periodicity is discontinuous, the interpolation pixels can be detected.

The periodicity determining unit 30 defines a determining area of a predetermined size so as to include the interpolation pixels, and determines whether the variations of the pixel values within the determining area have periodicity or not. The determining area may be an area corresponding to a height of one pixel which includes the interpolation pixels, namely, one line of the image, or a rectangular area having an arbitrary height which includes the interpolation pixels.

The size of the determining area may be defined by a user in advance, or it may be dynamically determined by the device. When the device dynamically determines the size, an interpolation process is performed within an area of a predefined size. If it is possible to perform an interpolation process for a smaller area, then the size may be reduced gradually to a certain size. Conversely, if it is not possible to perform an interpolation process, the size may be increased gradually to a certain size.

Figure 4A:
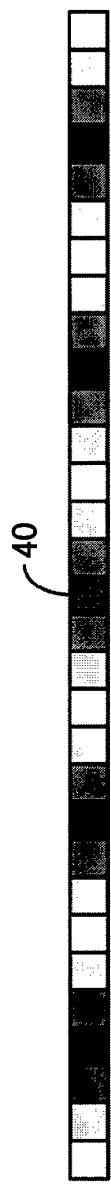
FIGS. 4A and 4B are diagrams illustrating a relationship among a determination area, positions of pixels in the horizontal direction in the determination area, and pixel values.
Figure 4B:
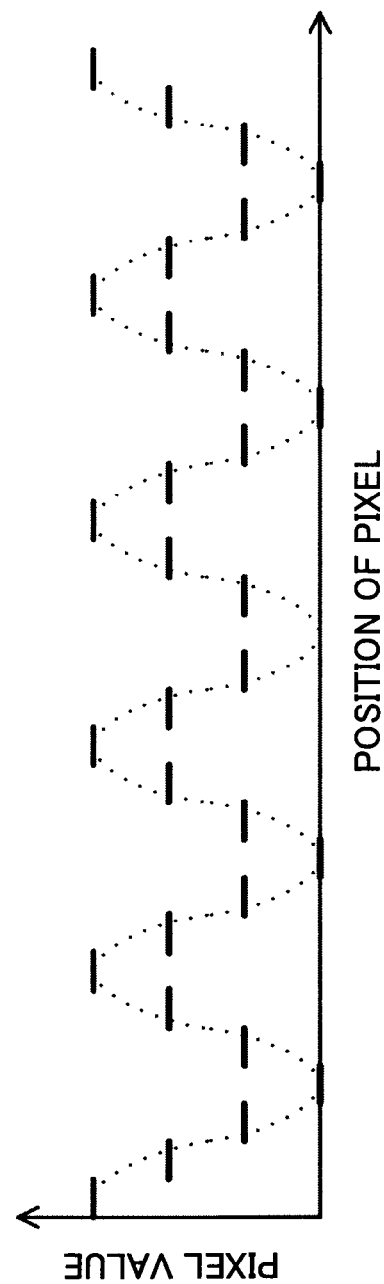

FIGS. 4A and 4B show an example in which one line of an image is extracted and set as the determining area. In FIG. 4A, pixels indicated by the black color and representing a halftone dot and pixels indicated by the white color and representing a background are evenly spaced apart, and between them gray pixels having different pixel values are arranged, so as to provide a gradation. Further, in FIG. 4A, the pixel 40 which is missing because of the above described gap is indicated.

FIG. 4B is a figure exemplifying a relationship between positions of the pixels in a horizontal direction in the determining area and pixel values. Since the pixel value is constant within the pixel, the pixel values indicate discrete values. However, when the discrete values are congruously connected, it can be represented by a waveform such that the pixel value increases and decreases at a constant period. Therefore, in the determining area, it can be determined that the variations of the pixel value have a periodicity.

Figure 5A:
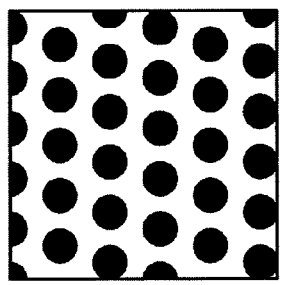
FIGS. 5A, 5B, and 5C are diagrams showing examples of periodic areas and non-periodic areas.
Figure 5A:
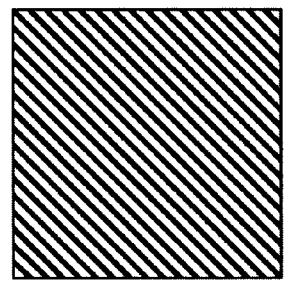
Figure 5B:
Figure 5B:
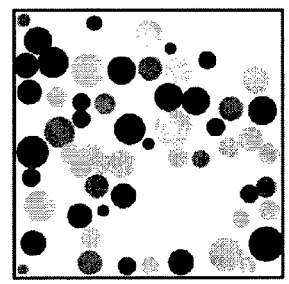
Figure 5C:
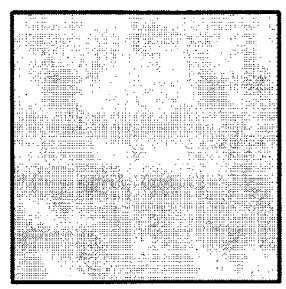
Figure 5C:

To exemplify the determination area having a periodicity, the halftone dots or the halftone dot area represented by diagonal lines shown in FIG. 5A can be considered. On the other hand, to exemplify the determination area having no periodicity, discontinuous areas including a character or points not arranged regularly shown in FIG. 5B, or flat areas represented by one color or a gradation shown in FIG. 5C can be considered.

Furthermore, for a halftone dot image represented by halftone dots, the dots are actually arranged in line with an arbitrary screen angle. Thus the dots are not evenly spaced apart in the horizontal direction, but the dots are evenly spaced apart in a slanted direction. Therefore, the waveform is not the same as the waveform shown in FIG. 4B, and the waveform does not have the same amplitude. The waveform has a different amplitude, but the waveform has a peak in each of the constant intervals. Therefore, it can be determined that the waveform has a periodicity.

By showing a diagram as in the cases of FIGS. 3 and 4, it can be easily determined whether the determination area has a periodicity or not. However, in practice, it is not possible to draw a diagram and to determine by referring to the diagram. Thus, for example, a representative period is obtained in the determination area, and the reliability of the representative period is calculated. The determination can be performed by determining whether the reliability is greater than or equal to a threshold value. As an example of obtaining a representative period, positions where the pixel value becomes a local maximum (peak positions) in the determination area, specifically, pixel positions at which the waveform shown in FIG. 4B indicates peaks in the positive direction are recorded. A histogram of a distance between a peak position and a next peak position is generated for the entirety of the determination area. Then a distance corresponding to a value of the most frequent class, that is a mode value, is selected as the representative period. The representative period can be represented in terms of the number of pixels. In the embodiment shown in FIGS. 4A and 4B, peaks are obtained for almost every 6th pixel, and it is the frequency that the distance between the peaks is 6 pixels. Thus the representative period is 6 pixels.

At this time, positions where the pixel value becomes a local minimum (pixel positions at which the waveform shown in FIG. 4B indicates peaks in the negative direction), instead of the positions where the pixel value becomes local maximum, can be used to obtain the representative period. When determining the representative period, the periodicity of the variation of the pixel value can be used, but its noise tolerance is low. Thus, when an autocorrelation of the pixel values are obtained, and if the periodicity of the variation of the autocorrelation is used, then the noise tolerance is improved. Therefore, when the representative period is obtained using local maximum positions and local minimum positions, it is preferable to use autocorrelation. Here, the reason for the improvement of the noise tolerance is as follows. In many cases, a noise is added to a pixel value. Therefore, when the autocorrelation, which is derived using plural pixel values, is used, the effect of the noise can be lowered compared to a case in which the pixel values are directly used.

An autocorrelation is a correlation between a signal and the same signal but a predetermined phase shift is added to the signal. In this case, autocorrelations are calculated in the determination area, and a histogram is created using the autocorrelation values instead of the pixel values. The mode value can be selected as the representative period. For a value of the autocorrelation, a correlation coefficient may be used. Alternatively, the calculation may be simplified by using a covariance.

A covariance S is an index indicating an amplitude of covariation of two pixel values. When i-th pixel value of one of patterns to be compared is defined to be $x_i$, i-th pixel value of the other patterns is defined to be $y_i$, the average value of the pixel values of the one of patterns is defined to be $x_m$, the average value of the pixel values of the other patterns is defined to be $y_m$, and the number of pixels in the pattern is n, the covariance S can be obtained by the formula 1 below.

$$S = \frac{1}{n}\sum_{i=1}^{n}(x_i - x_m)(y_i - y_m) \quad \text{[Expression 1]}$$

A correlation coefficient R is an index indicating similarity between two random variables. When a standard deviation of one of the patterns is defined to be $\sigma_x$, and a standard deviation of the other patterns is defined to be $\sigma_y$, the correlation coefficient R can be obtained by the formula 2 below.

$$R = \frac{\sum_{i=1}^{n}(x_i - x_m)(y_i - y_m)}{\sigma_x \sigma_y} \quad \text{[Expression 2]}$$

A reliability $C_v$ can be obtained, for example, using the formula 3 below. In the formula 3, T is the representative period obtained above, $F_r$ is a frequency of a distance corresponding to the representative period in the above described histogram, and N is the number of pixels in the determination area. Here, for $F_r$, not only the frequency of the representative period T, but also a total of frequencies of T±1 can be used so as to allow for an error in estimating the representative period. The formula 3 means that a ratio between an area occupied by peaks such that a distance between the peaks is the same as the representative period and the whole determination area is defined as a degree of reliability.

$$C_v = \frac{T \times F_r}{N} \quad \text{[Expression 3]}$$

When the degree of reliability is greater than a threshold value, it is determined that there is a periodicity, and when the degree of reliability is smaller than or equal to the threshold value, it is determined that there is no periodicity. However, the threshold value may be set by a user in advance, or the threshold value may be determined dynamically. When the threshold value is set in advance by the user, the threshold value is determined by obtaining a suitable degree of reliability for determining presence or absence of a periodicity through performing a simulation or an experiment, and the threshold value can be set. When the threshold value is determined dynamically, for example, degrees of reliability are obtained for the halftone dot area, which actually has a periodicity, and for a discontinuous area or a flat area, which do not have any periodicity, and the threshold value is determined to be their intermediate value.

When the periodicity determining unit 30 determines that an image area including interpolation pixels is an area having a periodicity (a periodic area), the boundary determining unit 31 determines whether the interpolation pixels are actually belonging to the periodic area. An interpolation pixel exists within one of a periodic area or a non-periodic area. The pixel value of the interpolation pixel can be estimated from a pixel value of a pixel that exists in the same area and in the vicinity of the interpolation pixel. This is because, since a pattern including several continued pixels centered by the interpolation pixel is similar to a pattern existing in the vicinity, the interpolation pixel can be estimated from the pattern existing in the vicinity.

However, when the interpolation pixel exists in the vicinity of a boundary area between a periodic area and a non-periodic area, if a pattern which exists in the vicinity but belongs to the non-periodic area is selected, though the interpolation pixel exists within the periodic area, the interpolation may be performed incorrectly. Therefore, the boundary determining unit 31 determines which area the interpolation pixel actually belongs to, so that a correct pattern within the periodic area can be selected and the estimation can be performed.

For example, reference areas are defined at positions which are separated from the interpolation pixel by a predetermined distance to the left and right. Within the reference areas defined at the left and right of the interpolation pixel, variances of the pixel values, being one of the image characteristics, are individually obtained. When both variances of the left and the right are greater than or equal to the threshold value, it is determined that the interpolation pixel belongs to the periodic area. When both variances of the left and the right are less than the threshold value, it is determined that the interpolation pixel belongs to the non-periodic area.

The above predetermined distance may be, for example, 3 pixels. When a halftone dot is placed every 6 pixels, for a pattern matching described later, 3 pixels to the left and 3 pixels to the right of the interpolation pixel, the interpolation pixel being the center, are used as templates. Therefore, the reference areas are defined at the positions separated from the interpolation pixel by three pixels to the left and right, that are outside of the templates and the closest positions to the templates. The reason why it is the closest positions is that a pattern similar to the template tends to exist in the vicinity of the template. Here, the distance is not limited to 3 pixels, and any distance can be used, provided that it is possible to appropriately determine whether the interpolation pixel exists in a periodic area or in a non-periodic area.

The reference area may be, for example, an area including the interpolation pixel having a height of 1 pixel, namely, 1 line of the image. Further, the reference area may be a rectangular area including the interpolation pixel having an arbitrary height, similarly to the above described determination area. The area can be set in advance by a user, or the device can dynamically determine the area, similarly to the case of the above described determination area. The reference area is not limited to the left and right of the interpolation pixel. The reference area can be defined above and below the interpolation pixel, or above, below, left, and right of the interpolation pixel. More than one area can be defined.

The variance can be obtained by the formula 4 below. In the formula 4, $x_i$ is the pixel value of i-th pixel in the reference area, $x_m$ is an average value of the pixel values of the pixels in the reference area, and n is the number of pixels within the reference area. Here, the variance can be substituted by a difference between the largest brightness value and the smallest brightness value of the pixels within the reference area. When the image is a color image, the variance can be substituted by a difference between the largest green component value (G component value) and the smallest green component value.

$$\sigma^2 = \frac{1}{n}\sum_{i=1}^{n}(x_i - x_m)^2 \quad \text{[Expression 4]}$$

The first pixel value generating unit 32 generates pixel values of the interpolation pixel using, for example, a pattern matching method as an interpolation method. As a specific example of the pattern matching method, a template matching method can be used. A template matching method uses a template, which is a designated portion of an image, to search for a position similar to the template. It can be performed by obtaining a degree of coincidence between the template and a pattern in the image.

Figure 6A:
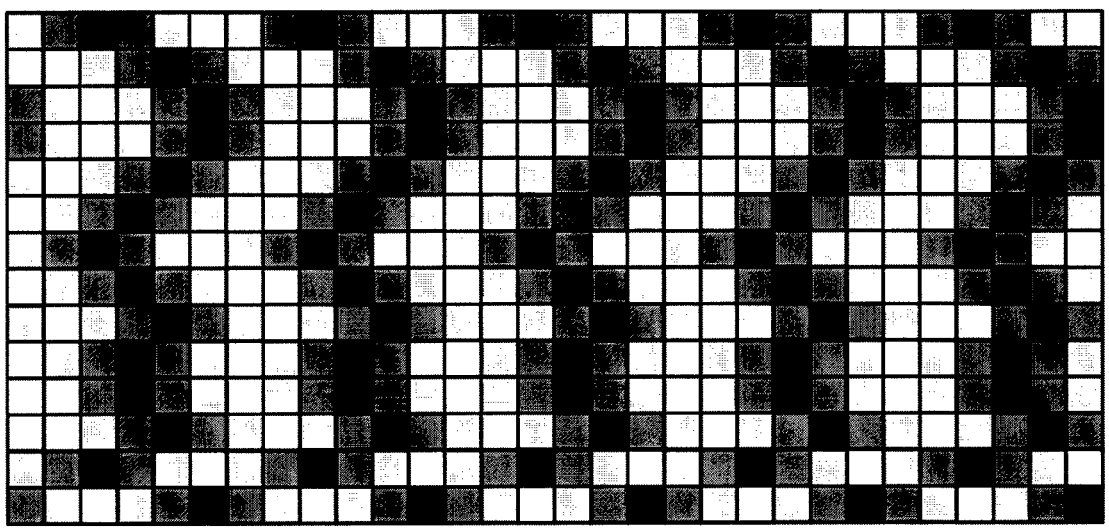
FIGS. 6A and 6B are diagrams illustrating an image to be processed and a template.
Figure 6B:
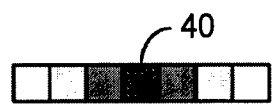

For example, when the image to be processed is as shown in FIG. 6A, a template can be obtained by identifying a pixel 40 in the image, which is to be interpolated and for which a pixel value is missing, as an interpolation pixel, and cutting out the predetermined area centered by the interpolation pixel, as shown in FIG. 6B.

A degree of coincidence between the template and a pattern having the same size as that of the template is obtained. Here, the pattern is placed at a position other than the position from which the template has been cut out. Then a pattern whose degree of coincidence is the highest is determined. The pixel value of the pixel placed at the center of the pattern is obtained as the pixel value of the interpolation pixel. As a degree of coincidence, a degree of dissimilarity, such as a sum of absolute difference (SAD) or a sum of squared difference (SSD), or a degree of similarity, such as a correlation coefficient or a covariance, may be used.

A pattern to be compared with the template is cut out, and for each pixel in the template, a difference between brightness values of the pixel and a pixel placed at the corresponding position in the pattern is obtained. The SAD is the sum of the differences. When the sum is small, it indicates that they are similar. When the sum is large, it indicates that they are dissimilar. Further, for the SSD, each difference between brightness values is squared, and their sum is used. When the sum is small, it indicates that they are similar. When the sum is large, it indicates that they are dissimilar. The correlation coefficient and the covariance can be obtained by formulas 1 and 2. The correlation coefficient takes a value from −1 to 1. When the value is close to 1, there is a strong positive correlation. When the value is close to 0, the correlation is weak. When the value is close to −1, there is a negative correlation. That means, when the correlation coefficient is close to 1, the pattern is similar, and when the correlation coefficient is close to −1, the pattern is inverted. Therefore, it can be determined that when the value is large, the degree of similarity is high. Since the covariance corresponds to the correlation coefficient, it can be determined that when the value is large, the degree of similarity is high.

When the degree of coincidence is evaluated, it is preferable that the interpolation pixel be removed from the calculation of the degree of coincidence so that the interpolation pixel does not affect the degree of coincidence, or it is preferable that, for the interpolation pixel, a temporary pixel value be assigned using the pixel value of the pixel placed at the corresponding position in the pattern to be compared. Further, for a similar pattern, plural patterns may be selected in a descending order in the degree of coincidence.

Further, when plural interpolation pixels exist in the whole image, for the calculation of the degree of coincidence, it is preferable that not only the interpolation pixel currently to be interpolated, but also other interpolation pixels be removed from the calculation, or it is preferable that, for the other interpolation pixels, temporary pixel values be assigned using the pixel values of the pixels placed at the corresponding positions in the pattern to be compared. This is because it is possible that not only the interpolation pixel currently to be interpolated, but also other interpolation pixels are included in a reference pattern or a pattern to be compared. Basically, the interpolation pixel does not have a pixel value, or the interpolation pixel has an incorrect value. Therefore, it is not suitable that the interpolation pixels are used for the calculation of the degree of coincidence. Here, the pixel value of the interpolation pixel, which has already been interpolated, can be used for the calculation of the degree of coincidence. Further, when there exists an interpolation pixel in the pattern to be compared, it is preferable that the interpolation pixel be removed from the calculation so that the interpolation pixel is not used for the calculation of the degree of coincidence, or it is preferable that a temporary pixel value be assigned using the pixel value of the pixel placed at the corresponding position in the reference pattern.

In the most similar pattern determined in this manner, the pixel value of the pixel placed at the position corresponding to the position of the interpolation pixel in the template is obtained. When only the most similar pattern is used, the pixel value obtained in this manner can be set as the pixel value of the interpolation pixel. When plural similar patterns are used, the pixel values obtained from the plural patterns are combined, and the pixel value of the interpolation pixel can be obtained. As methods for combining the pixel values, the following methods can be considered. Namely, a method in which pixel values are averaged using the same weight, and a method in which pixel values are weighted, so that the pattern having a higher degree of similarity has a larger weight, and averaged.

Further, as the template matching methods, there are a two-dimensional template matching method and a one-dimensional template matching method. In the two-dimensional template matching method, the most similar pattern is found out by cutting out an arbitrary area in the vicinity of the interpolation pixel in the image, namely, an arbitrary area placed at left, right, above, below, and oblique to the interpolation pixel, as a pattern, and by obtaining the degree of coincidence between the pattern and the template. On the other hand, in the one-dimensional template matching method, the most similar pattern is found out by cutting out a pattern from the one line on which the interpolation pixel exists, and by obtaining the degree of coincidence.

The second pixel value generating unit 33 generates a pixel value of an interpolation pixel using an interpolation method which is different from that of the first pixel value generating unit 32. As a different interpolation method, the following interpolation methods can be used. Namely, the interpolation methods include a nearest-neighbor interpolation (zero-order interpolation), a linear interpolation (first-order interpolation), a parabolic interpolation (second-order interpolation), a cubic interpolation (third-order interpolation), a polynomial interpolation, a spline interpolation, and a Lagrange interpolation. A bilinear interpolation and a bicubic interpolation, for which the liner interpolation and the cubic interpolation are expanded two-dimensionally, may be used.

Figure 7A:
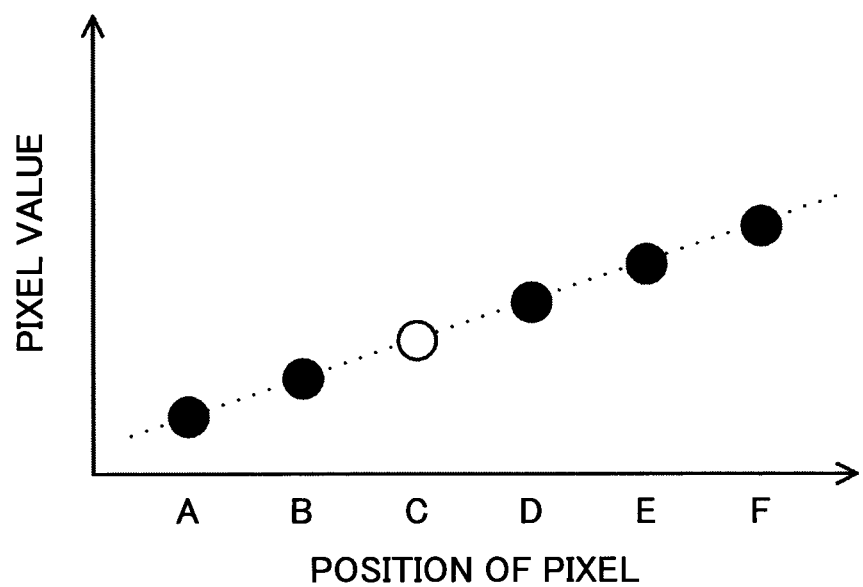
FIGS. 7A and 7B are diagrams illustrating a relationship between positions of pixels and pixel values.

Suppose that pixels A-F are arranged in one line in this order, and a pixel value of pixel C is missing. FIG. 7A is a diagram showing a graph which indicates a relationship between positions of pixels and pixel values. The actual pixel value of pixel C is the value indicated by the white dot. In this case, since the pixel value increases about a constant value as the pixel position moves one position, a relationship between a position of the pixel and a pixel value can be represented by a linear function. The pixel value of pixel C to be interpolated can be calculated using the obtained linear function (linear interpolation).

Figure 7B:
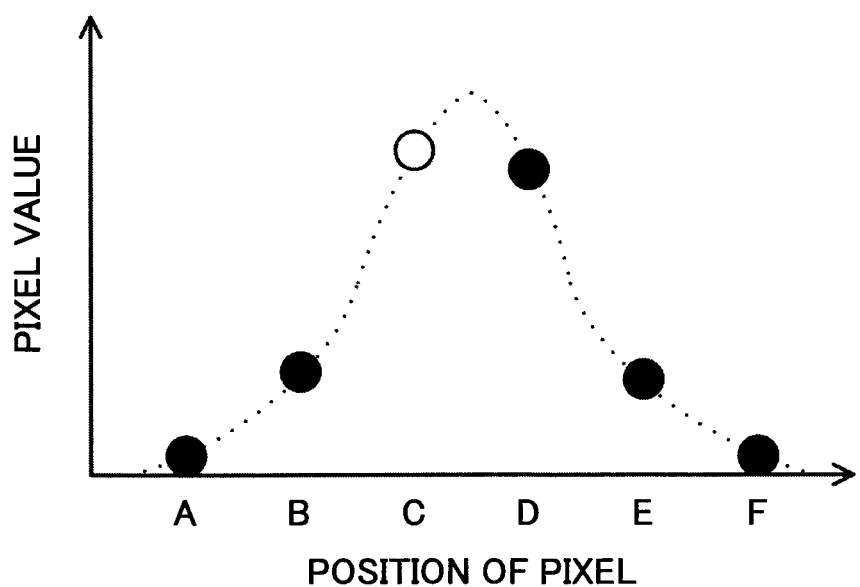

Further, when the pixel value is represented by a curved line shown in FIG. 7(*b*), the interpolation is performed by selecting the most suitable interpolation method for the curved line. When the curved line can be represented by a quadratic function, the parabolic interpolation may be selected. When the curved line can be represented by a cubic function, the cubic interpolation may be selected. When the curved line can be represented by a polynomial, the polynomial interpolation or the Lagrange interpolation may be selected. When the curved line can be represented by individual polynomials, the spline interpolation may be selected.

Here, it is assumed that the first pixel value generating unit 32 adopts the pattern matching method and the second pixel value generating unit 33 adopts the internal interpolation method. However, the first pixel value generating unit 32 may adopt an internal interpolation method and the second pixel value generating unit 33 may adopt a pattern matching method. Further, different interpolation methods, such as the linear interpolation and the spline interpolation, may be adopted (though both of them are internal interpolation methods).

The control unit 34 receives the image to be processed and transmits it to the periodicity determining unit 30 and the boundary determining unit 31. Then the control unit 34 receives the results determined by the periodicity determining unit 30 and the boundary determining unit 31 and determines which of the first pixel value generating unit 32 and the second pixel value generating unit 33 is to be used for generating the pixel value, based on the results. For example, when the periodicity determining unit 30 determines that there is a periodicity and the boundary determining unit 31 determines that it is within the periodic area, the control unit 34 adopts the first pixel value generating unit 32 which uses the pattern matching method. For the other cases, the control unit 34 may adopt the second pixel value generating unit 33 which uses the internal interpolation method. Then the control unit 34 transmits the image to the determined pixel value generating unit, receives the pixel value generated by the determined pixel value generating unit, and transmits the pixel value along with the image and positional information of the pixel, which have been set, to the pixel value inputting unit 35.

The pixel value inputting unit 35 inputs the pixel value generated by adopting one of the first pixel value generating unit 32 and the second pixel value generating unit 33, which has been determined by the control unit 34, to the interpolation pixel, which has been set before. This completes the interpolation process for one interpolation pixel. When there are plural interpolation pixels, the processes at the corresponding units described above are repeated for the number of the interpolation pixels.

Figure 8:
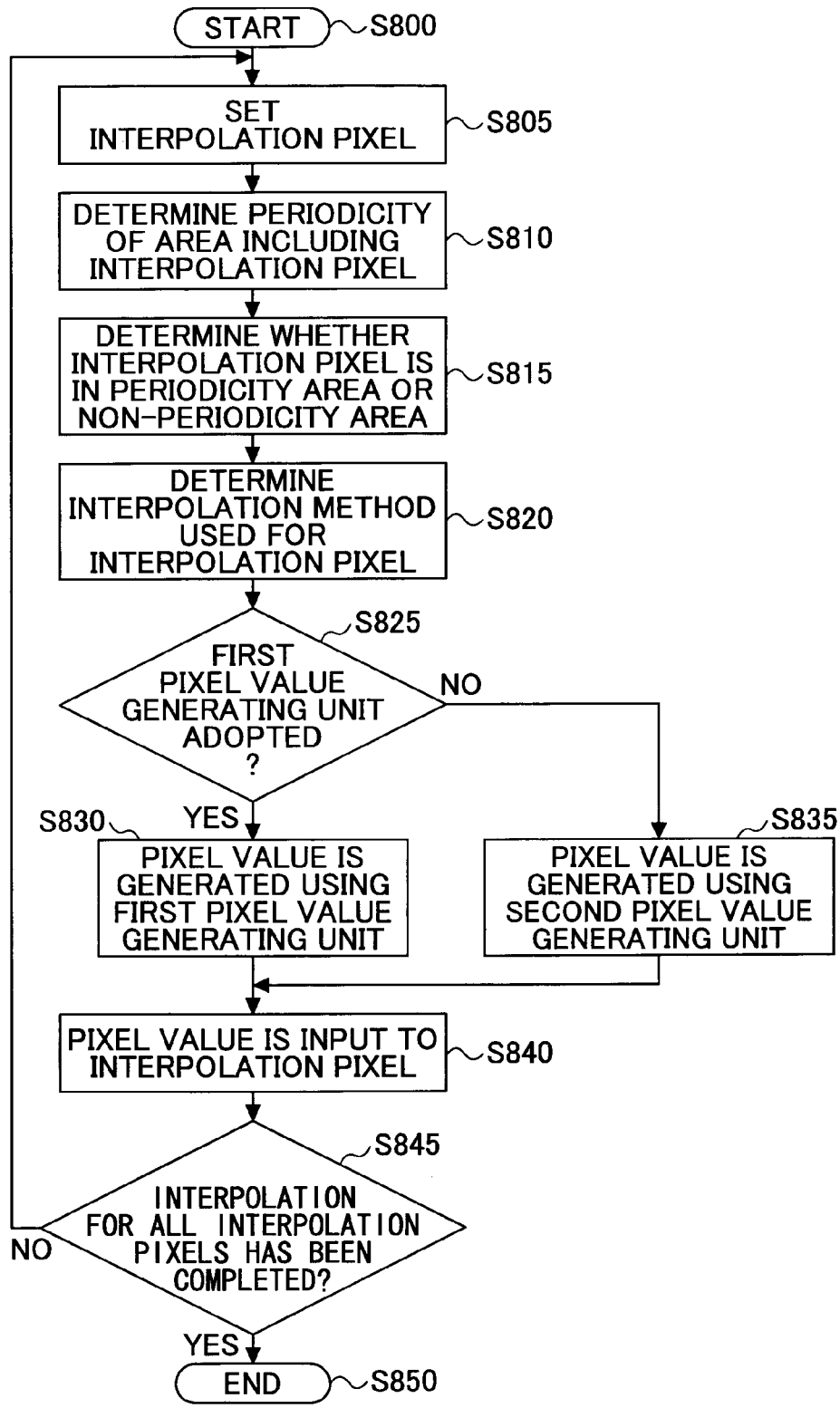
FIG. 8 is a flowchart diagram illustrating a flow of a pixel interpolation process performed by the image processing device shown in FIG. 2.

The process in which these units perform the corresponding processes, the pixel value of the interpolation pixel is generated, and the interpolation pixel is interpolated by the pixel value is explained by referring to the flowchart shown in FIG. 8. The process starts from step S800. Firstly, at step S805, the pixel setting unit detects an interpolation pixel to which the pixel value is to be input, and the pixel setting unit sets the interpolation pixel to which the interpolation process is to be applied. The detection can be performed using the above described method. When plural interpolation pixels exist, for example, the interpolation pixels are arranged in the order of the coordinate positions where the interpolation pixels are placed. Then the interpolation pixels are chosen one by one sequentially, and the chosen one can be set.

At step S810, the periodicity determining unit 30 specifies an area including the interpolation pixel, and within the area, the periodicity determining unit 30 determines whether the variation of the pixel value has a periodicity or not. The area is specified and presence or absence of the periodicity is determined using the above described determination method of the size of the area and determination method of the periodicity. Subsequently, at step S815, it is determined which one of the areas the interpolation pixel actually belongs to. For this determination, the above described method of determining the boundary and the method of determining the size of the reference area are adopted. Then variances are individually obtained for the left and right reference areas, and the determination is made by determining whether the obtained variances for the left and right reference areas are greater than or equal to the threshold value. When the variances are greater than or equal to the threshold value, it is determined that the interpolation pixel exists in the periodic area.

Then, at step S820, the interpolation method used for the interpolation pixel is determined. That is, the control unit 34 determines which one of the first pixel value generating unit 32 and the second pixel value generating method 33 is to be adopted for generating the pixel value of the interpolation pixel, based on the determined results at step S810 and step S815. At step S825, it is determined whether the first pixel value generating unit 32 is adopted or not. Since the first pixel value generating unit 32 uses the pattern matching method, when it is determined that the area has a periodicity and the interpolation pixel exists in the periodic area, it is determined that the first pixel value generating unit 32 is adopted.

When it is determined that the first pixel value generating unit 32 is adopted at step S825, then the process proceeds to step S830, and the pixel value of the interpolation pixel is generated by the interpolation method used by the first pixel value generating unit 32. On the other hand, when it is determined that the first pixel value generating unit 32 is not adopted at step S825, the process proceeds to step S835, and the pixel value of the interpolation pixel is generated by the interpolation method used by the second pixel value generating unit 33.

Subsequently, at step S840, the pixel value of the interpolation pixel generated at step S830 or step S835 is input to the interpolation pixel, which has been set at step S805. Since the interpolation pixel may not have a pixel value, or may have an incorrect pixel value, the pixel value is defined to the interpolation pixel by inputting the pixel value generated for the interpolation pixel. Then the process proceeds to step S845, and it is determined whether the interpolation for all the interpolation pixels has been completed. When plural interpolation pixels are detected at step S805, it is determined whether the generated pixel values are input to all the interpolation pixels.

When it is determined, at step S845, that the interpolation for all the interpolation pixels has been completed, the process proceeds to step S850, and terminates the process. On the other hand, when it is determined that the interpolation is not completed, then the process returns to step S805. Then the next interpolation pixel is set, the pixel value is generated, and the process to input the pixel value is performed.

Figure 9:
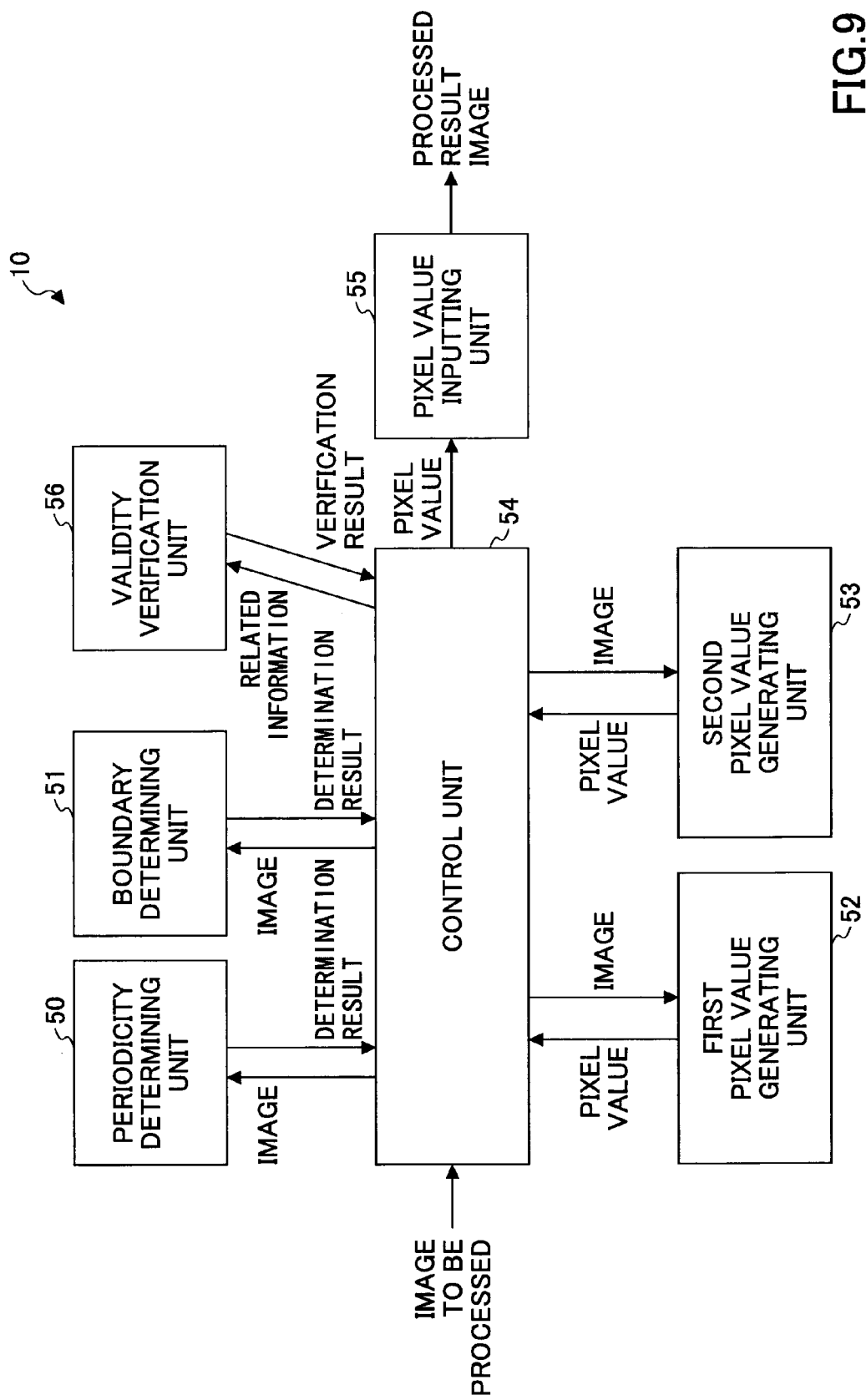
FIG. 9 is a functional block diagram illustrating a second embodiment of the image processing device.

FIG. 9 is a functional block diagram illustrating a second embodiment of the image processing device. In the embodiment, similar to the first embodiment shown in FIG. 2, the image processing device includes a periodicity determining unit 50, a boundary determining unit 51, a first pixel value generating unit 52, a second pixel value generating unit 53, a control unit 54, and a pixel value inputting unit 55. Additionally, the image processing device includes a validity verification unit 56 which verifies validity of the pixel value of the interpolation pixel generated by one of the first pixel value generating unit 52 or the second pixel value generating unit 53. Namely, the validity verification unit verifies whether the pixel value generated, when the first pixel value generating unit 52 is adopted, and when it is determined that the pixel value is not valid, the pixel value of the interpolation pixel is generated by the second pixel value generating unit 53.

Since the processes performed by the periodicity determining unit 50, the boundary determining unit 51, the first pixel value generating unit 52, the second pixel value generating unit 53, the control unit 54, and the pixel value inputting unit 55 are the same as the above described first embodiment, the explanations are omitted here, and the validity verification unit 56 is explained. The validity verification unit 56, for example, determines whether the pixel value generated by the first pixel value generating unit 52 is valid or not.

The verification of the validity can be performed using related information that is obtained when the first pixel value generating unit 52 generates the pixel value. As the related information, when the first pixel value generating unit 52 uses the pattern matching method as the interpolation method, a degree of dissimilarity or a degree of similarity between the template and the pattern to be compared can be considered. For the degree of dissimilarity or the degree of similarity, the above described the SAD, the SSD, the correlation coefficient, or the covariance can be used.

The validity verification unit 56 obtains the degree of dissimilarity or the degree of similarity between the optimum pattern and the reference pattern including the interpolation pixel. Here, the optimum pattern is a predetermined area within the image that is adopted by the first pixel value generating unit 52, when the first pixel value generating unit 52 generates the pixel value using the pattern matching method as a first interpolation method. The validity may be verified by determining whether the degree of dissimilarity is less than the threshold value, or by determining whether the degree of similarity is greater than or equal to the threshold value. When the degree of dissimilarity is less than the threshold value, it is valid, and when the degree of similarity is greater than or equal to the threshold value, it is valid.

Therefore, in the validity verification unit 56, the degree of dissimilarity or the degree of similarity threshold is processed, and whether the degree of the dissimilarity is less than the threshold value or the degree of similarity is greater than or equal to the threshold value can be used as a condition to verify the validity. The threshold value, similar to the above described threshold value, can be defined in advance by a user, or the device can dynamically determine the threshold value.

In accordance with this, the control unit 54 verifies whether the pixel value generated at the time when the first pixel value generating unit 52 is adopted, is valid or not, by the validity verification unit 56. When it is determined that it is not valid, the control unit generates the pixel value of the interpolation pixel by the second pixel value generating unit 53. However, it is not limited by this. It can be realized by parallel processing such that the pixel values are generated by both the first pixel value generating unit 52 and the second pixel value generating unit 53 in advance, and based on the verification result of the validity verification unit 56, one of the pixel values is selected.

Figure 10:
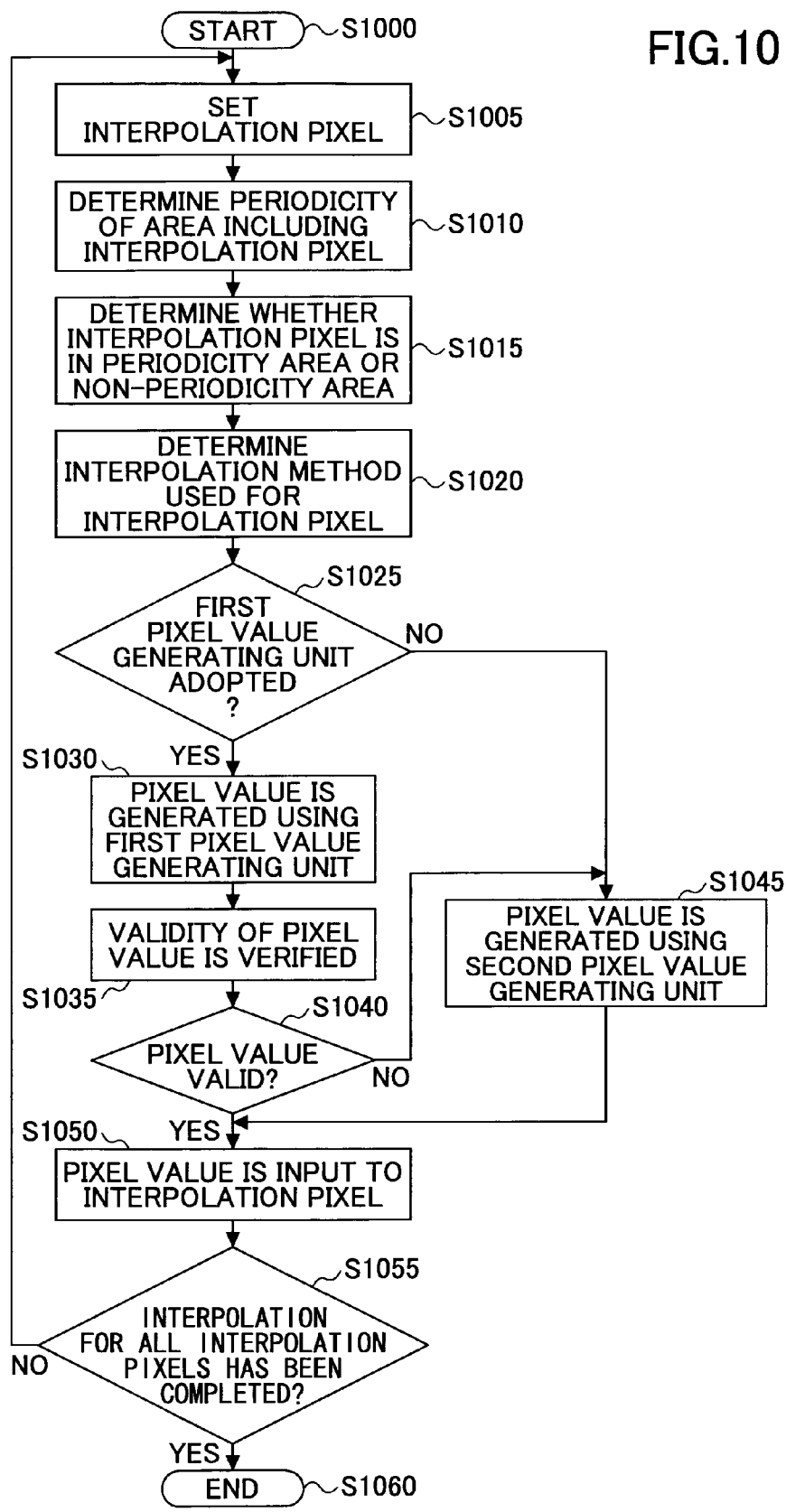
FIG. 10 is a flowchart diagram illustrating a flow of a pixel interpolation process performed by the image processing device shown in FIG. 9.

The process of correcting the pixel value of the interpolation pixel using the image processing device shown in FIG. 9 is explained by referring to the flowchart shown in FIG. 10. The process starts at step S1000. Firstly, at step S1005, pixel setting unit not shown in FIG. 9 detects an interpolation pixel to which the pixel value is to be input, and sets the interpolation pixel. The detection can be performed using the above described method. When plural interpolation pixels exist, one of them is set, similarly to the above description.

At step S1010, the periodicity determining unit 50 determines, within the area including the interpolation pixel, whether the variation of the pixel value has a periodicity or not. The periodicity is determined using the above described method of determining the size of the area and the method of determining the periodicity. Subsequently, at step S1015, the boundary determining unit 51 determines which one of the areas the interpolation pixel actually belongs to. For this determination, the above described method of determining the boundary and the method of determining the size of the reference area are adopted. Then variances are individually obtained for the left and right reference areas, and the determination is made by determining whether the obtained variances for the left and right reference areas are greater than or equal to the threshold value. When the variances are greater than or equal to the threshold value, it is determined that the interpolation pixel exists in the periodic area.

Then, at step S1020, the interpolation method used for the interpolation pixel is determined. That is, the control unit 54 determines which one of the first pixel value generating unit 52 and the second pixel value generating method 53 is to be adopted for generating the pixel value of the interpolation pixel, based on the determined results at step S1010 and step S1015. At step S1025, it is determined whether the first pixel value generating unit 52 is adopted or not.

When it is determined that the first pixel value generating unit 52 is adopted at step S1025, the process proceeds to step S1030, and the pixel value of the interpolation pixel is generated by the interpolation method used by the first pixel value generating unit 52, that is, the pattern matching method. Subsequently, at step S1035, the validity verification unit 56 verifies whether the pixel value generated by the first pixel value generating unit 52 is valid or not, and at step S1040, it is determined whether the pixel value is valid or not. The determination of whether the pixel value is valid or not may be performed by using the related information obtained at the time when the pixel value is generated, specifically, by using the degree of dissimilarity or the degree of similarity, and by determining whether the degree of dissimilarity is less than the threshold value or by determining whether the degree of similarity is greater than or equal to the threshold value.

When it is determined that the first pixel value generating unit 52 is not adopted at step S1025, the process proceeds to step S1045, and the pixel value of the interpolation pixel is generated by the interpolation method used by the second pixel value generating unit 53, that is, the internal interpolation method. Further, when it is determined that it is not valid at step S1040, the process proceeds to step S1045, and the pixel value of the interpolation pixel is generated by the interpolation method used by the second pixel value generating unit 53.

When it is determined that the pixel value is valid at step S1040, or when the pixel value of the interpolation pixel is generated by the second pixel value generating unit 53 at step S1045, then the process proceeds to step S1050, and the pixel value is input to the interpolation pixel which has been detected at step S1005. In this manner, the pixel value is set as the pixel value of the interpolation pixel. Then the process proceeds to step S1055, and it is determined whether the interpolation for all the interpolation pixels has been completed. When plural interpolation pixels, which have been set at step S1005, exist, it is determined whether the pixel values are input to all the plural interpolation pixels.

When it is determined, at step S1055, that the interpolation for all the interpolation pixels has been completed, the process proceeds to step S1060, and terminates this process. On the other hand, when it is determined that the interpolation is not completed, then the process returns to step S1005. Then the next interpolation pixel is set, the pixel value is generated, and the process to input the pixel value is performed.

Figure 11:
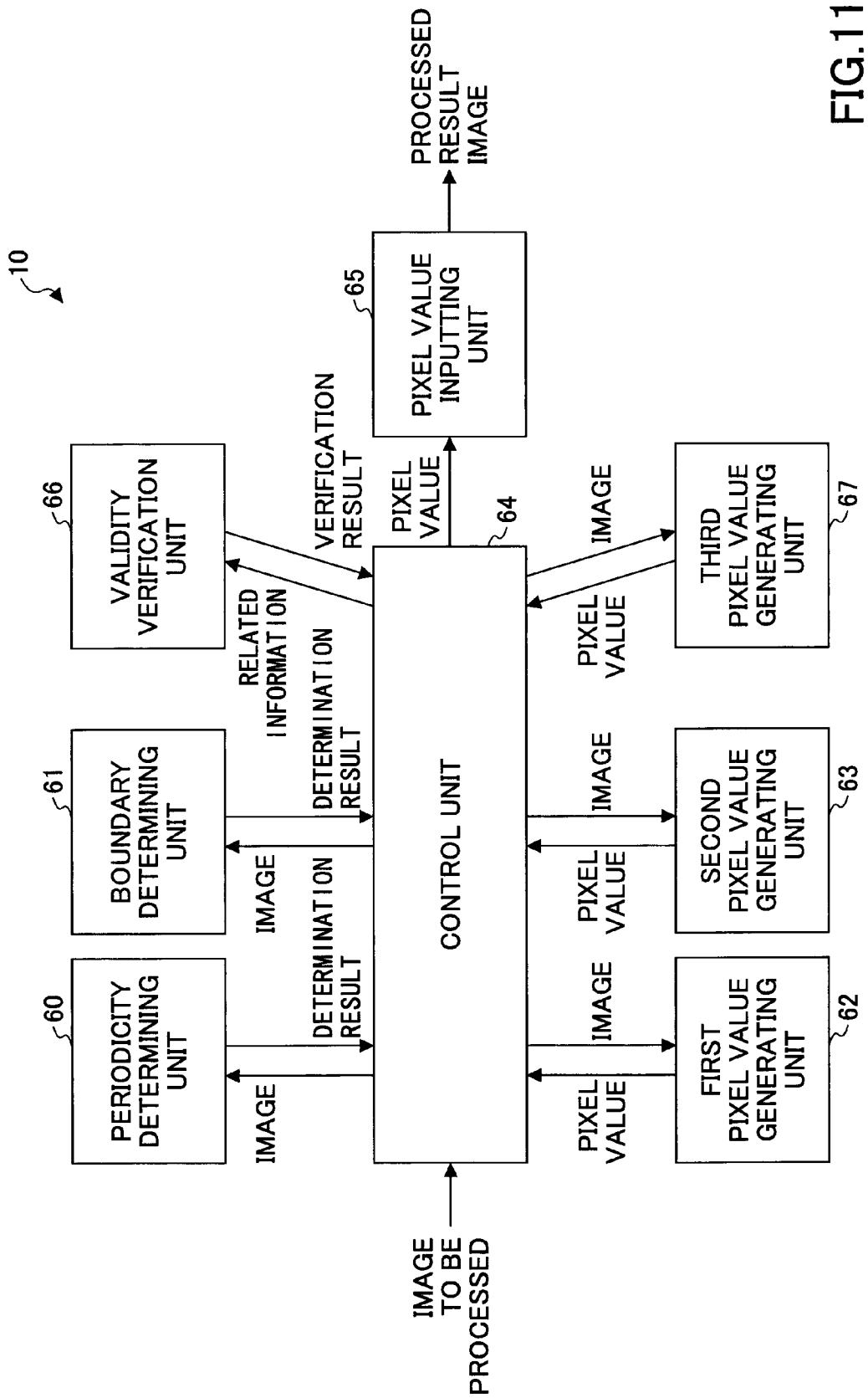
FIG. 11 is a functional block diagram illustrating a third embodiment of the image processing device.

FIG. 11 is a functional block diagram showing a third embodiment of the image processing device. In the embodiment, similarly to the second embodiment shown in FIG. 9, the image processing device includes a periodicity determining unit 60, a boundary determining unit 61, a first pixel value generating unit 62, a second pixel value generating unit 63, a control unit 64, a pixel value inputting unit 65, and a validity verification unit 66. Additionally, the image processing device includes a third pixel value generating unit 67 that generates the pixel value of the interpolation pixel using a method, which is different from the interpolation methods adapted by the first pixel value generating unit 62 or the second pixel value generating unit 63. Therefore, the image processing device is configured as follows. Namely, the validity verification unit 66 verifies whether the pixel value, which is generated at the time when the first pixel value generating unit 62 is adopted, is valid or not. When it is determined that it is not valid, the pixel value of the interpolation pixel is generated by the third pixel value generating unit 67. The validity verification unit 66 verifies whether the pixel value is valid or not. When it is determined that the pixel value is not valid, the pixel value of the interpolation pixel is generated by the second pixel value generating unit 63.

In the third embodiment, only the third pixel value generating unit 67 is added to the configuration of the second embodiment shown in FIG. 9. However, the embodiment is not limited to this, and a fourth pixel value generating unit and a fifth pixel value generating unit may be added, and the image processing device may includes 4 or more pixel value generating units. In this case, it is determined whether the pixel value generated by one of the pixel value generating units is valid or not, and when it is determined that it is not valid, then the pixel value may be generated by another pixel value generating unit.

In the third embodiment, the processes performed by the periodicity determining unit 60, the boundary determining unit 61, the first pixel value generating unit 62, the second pixel value generating unit 63, the control unit 64, the pixel value inputting unit 65, and the validity verification unit 66 are the same as the above described second embodiment. For the third pixel value generating unit 67, only the interpolation method is different, and similarly to the first pixel value generating unit 62 and the second pixel value generating unit 63, it generates the pixel value of the interpolation pixel. Therefore, explanations for these are omitted.

Further, the validity verification unit 66 verifies whether the pixel value generated at the time when the first pixel value generating unit 62 is adopted is valid. When it is determined that it is not valid, the pixel value of the interpolation pixel is generated by the third pixel value generating unit 67. Then the validity verification unit 66 verifies whether the generated pixel value is valid or not. When it is determined that it is not valid, the pixel value of the interpolation pixel is generated by the second pixel value generating unit 63. However, the embodiment is not limited to this. It can be realized by parallel processing such that the pixel values of the interpolation pixels are generated in advance by the first pixel value generating unit 62, the second pixel value generating unit 63, and the third pixel value generating unit 67, and depending on the verification result of the validity verification unit 66, one of the pixel values is selected.

Figure 12:
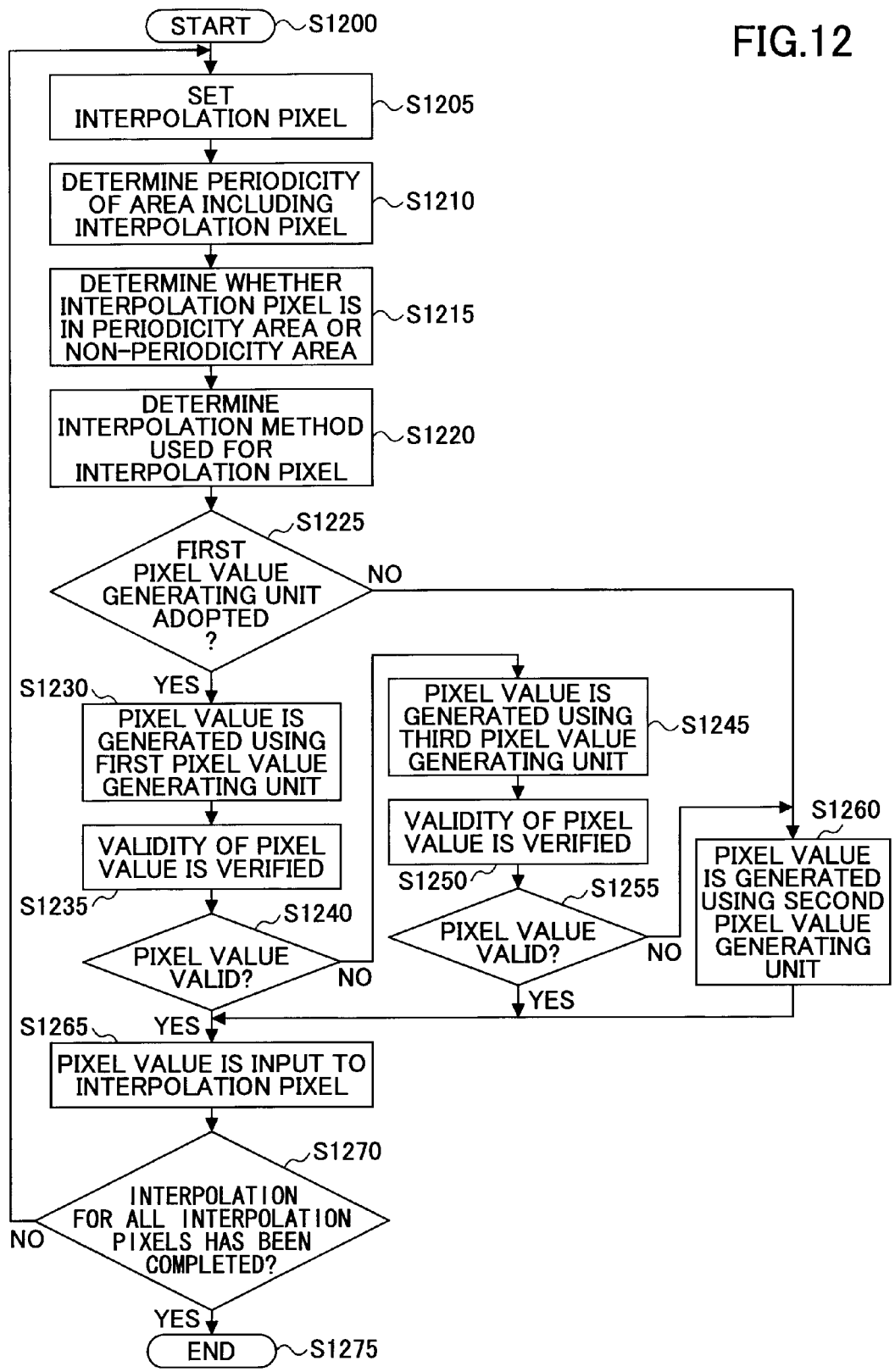
FIG. 12 is a flowchart diagram illustrating a flow of a pixel interpolation process performed by the image processing device shown in FIG. 11.

The process of correcting the pixel value of the interpolation pixel using the image processing device shown in FIG. 11 is explained by referring to the flowchart shown in FIG. 12. The process starts from step S1200. Firstly, at step S1205, the pixel setting unit not shown in FIG. 11 detects an interpolation pixel to which the pixel value is to be input, and sets the interpolation pixel. The detection can be performed using the above described method. In this case, similarly, when plural interpolation pixels exist, one of them is set.

At step S1210, within the area including the interpolation pixel, it is determined whether the variation of the pixel value has a periodicity or not. The periodicity is determined using the above described method of determining the size of the area and the method of determining the periodicity. Subsequently, at step S1215, it is determined which one of the areas the interpolation pixel actually belongs to. For this determination, the above described method of determining the boundary and the method of determining the size of the reference area are adopted. Then variances are individually obtained for the left and right reference areas, and the determination is made by determining whether the obtained variances for the left and right reference areas are greater than or equal to the threshold value. When the variances are greater than or equal to the threshold value, it is determined that the interpolation pixel exists in the periodic area.

Then, at step S1220, the interpolation method used for the interpolation pixel is determined. That is, the control unit 64 determines which one of the first pixel value generating unit 62, the second pixel value generating method 63, and the third pixel value generating unit 67 is to be adopted for generating the pixel value of the interpolation pixel, based on the determined results at step S1210 and step S1215. At step S1225, it is determined whether the first pixel value generating unit 62 is adopted or not.

When it is determined that the first pixel value generating unit 62 is adopted at step S1225, the process proceeds to step S1230, and the pixel value of the interpolation pixel is generated by the interpolation method used by the first pixel value generating unit 62. Subsequently, at step S1235, the validity verification unit 66 verifies whether the pixel value generated by the first pixel value generating unit 62 is valid or not, and at step S1240, it is determined whether the pixel value is valid or not.

The determination of the validity is performed using related information which is obtained at the time when the first pixel value generating unit 62 generates the pixel value. When the interpolation method adopted by the first pixel value generating unit 62 is the pattern matching method, the degree of dissimilarity or the degree of similarity between the template and the optimum pattern, which is used for generating the pixel value, is used as the related information, and when the degree of dissimilarity is less than the threshold value or when the degree of the similarity is greater than or equal to the threshold value, it is determined that it is valid. At this time, the template from which the interpolation pixel is removed, or the template to which the generated pixel value is input may be used.

When it is determined that the pixel value is not valid at step S1240, the process proceeds to step S1245, and the pixel value of the interpolation pixel is generated by the interpolation method used by the third pixel value generating unit 67. Subsequently, at step S1250, the validity verification unit 66 verifies whether the pixel value generated by the third pixel value generating unit 67 is valid or not, and at step S1255, it is determined whether the pixel value is valid.

When it is determined, at step S1225, that the first pixel value generating unit 62 is not adopted, or when it is determined, at step S1255, that the pixel value is not valid, the process proceeds to step S1260, and the pixel value of the interpolation pixel is generated by the interpolation method used by the second pixel value generating unit 63.

When it is determined, at step S1240, that the pixel value is valid, or when it is determined, at step S1255, that the pixel value is valid, or when the pixel value is generated at step S1260, the process proceeds to step 1265, and the pixel value is input to the interpolation pixel detected at step S1205. Then the process proceeds to step S1270, and it is determined whether the interpolation for all the interpolation pixels is completed. When plural interpolation pixels have been detected at step S1205, it is determined whether the pixel values are input to all the interpolation pixels.

When it is determined, at step S1270, that the interpolation for all the interpolation pixels has been completed, the process proceeds to step S1275, and terminates the process. On the other hand, when it is determined that the interpolation is not completed, then the process returns to step S1205. Then the next interpolation pixel is set, the pixel value is generated, and the process to input the pixel value is performed.

In the forth embodiment of the image processing device, similarly to the third embodiment shown in FIG. 11, the periodicity determining unit 60, the boundary determining unit 61, the first pixel value generating unit 62, the second pixel value generating unit 63, the control unit 64, the pixel value inputting unit 65, the validity verification unit 66 and the third pixel value generating unit are included. Therefore, the functional block diagram is omitted. The image processing device is configured such that the first pixel value generating unit 62, the second pixel value generating unit 63, and the third pixel value generating unit 67 are switched, depending on the determination result of the periodicity determining unit 60 and the determination result of the boundary determining unit 61.

As an example of a method of determining the interpolation method, when the area including the interpolation pixel has a periodicity, and when the interpolation pixel is placed within the periodic area, the first pixel value generating unit 62 may be adopted; when the area including the interpolation pixel has a periodicity, and when the interpolation pixel is placed within the non-periodic area, the second pixel value generating unit 63 may be adopted; and when the area including the interpolation pixel does not have any periodicity, the third pixel value generating unit 67 may be adopted.

As another example, when the period of the area including the interpolation pixel is short, and when the interpolation pixel is placed within the periodic area, the first pixel value generating unit 62 may be adopted; when the period of the area including the interpolation pixel is short, and when the interpolation pixel is placed within the non-periodic area, the second pixel value generating unit 63 may be adopted; and otherwise, the third pixel value generating unit 67 may be adopted.

In the embodiment, when the first pixel value generating unit 62 is adopted, the validity verification unit 66 verifies whether the pixel value generated is valid or not. When the first pixel value generating unit 62 is not adopted, then it is determined whether the third pixel value generating unit 67 is adopted. When the third pixel value generating unit 67 is adopted, the pixel value of the interpolation pixel is generated by the third pixel value generating unit 67, and the validity verification unit verifies whether the generated pixel value is valid or not. When the third pixel value generating unit 67 is not adopted, the pixel value of the interpolation pixel is generated by the second pixel value generating unit 63. However, the embodiment is not limited to this. It can be realized by parallel processing such that the pixel values of the interpolation pixel are generated in advance by the first pixel value generating unit 62, the second pixel value generating unit 63, and the third pixel value generating unit 67, and one of the pixel values is selected based on the verification result of the validity verification unit 66.

Figure 13:
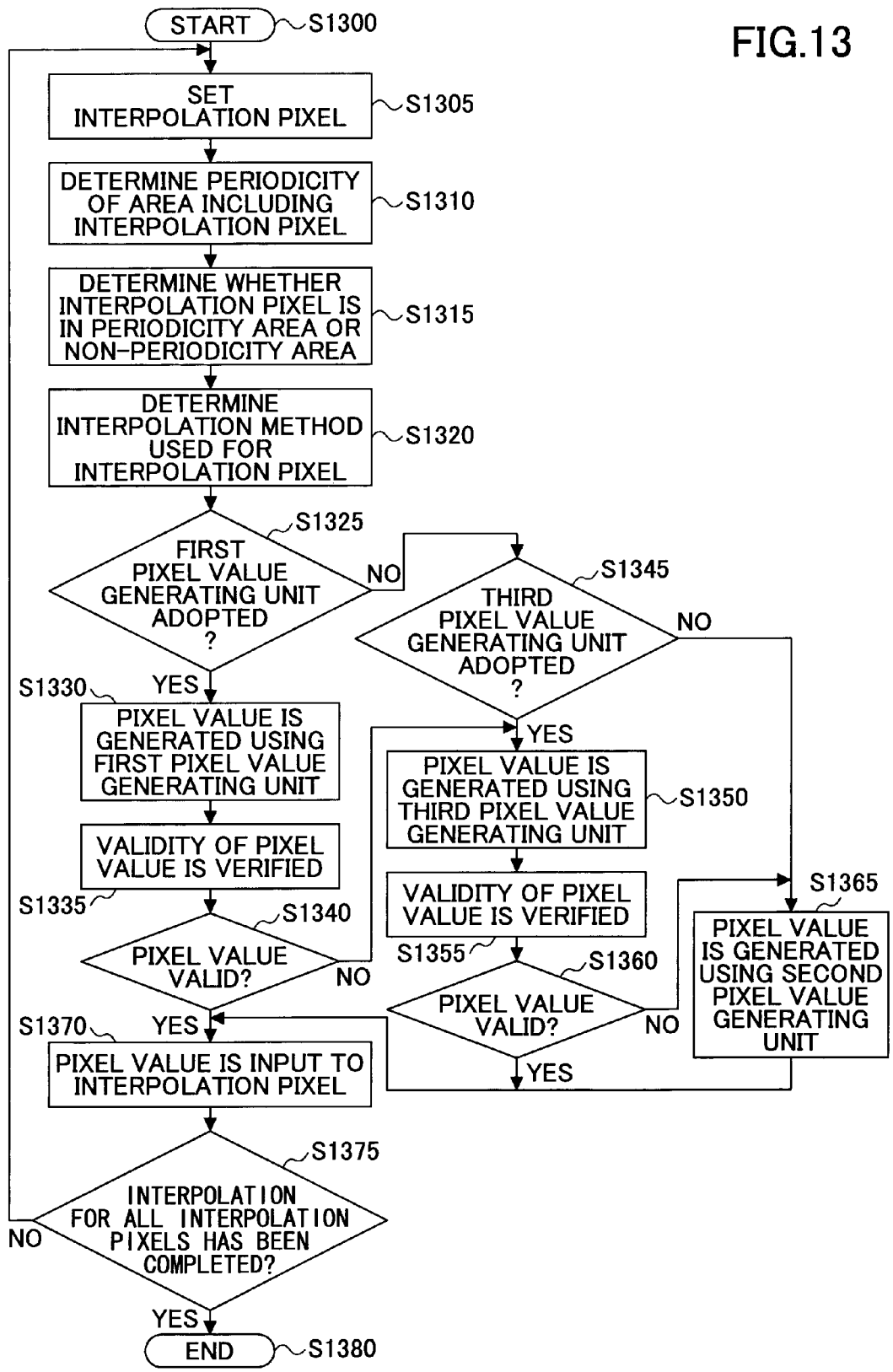
FIG. 13 is a flowchart diagram illustrating a flow of a pixel interpolation process performed by the image processing device shown in FIG. 11.

The process of correcting the pixel value of the interpolation pixel using the image processing device according to the fourth embodiment is explained by referring to the flowchart shown in FIG. 13. The process starts from step S1300. Firstly, at step S1305, an interpolation pixel to which the pixel value is to be input is detected, and the interpolation pixel is set. The detection can be performed by the above described method. In this case, similarly, when plural interpolation pixels exist, one of them is set.

At step S1310, within the area including the interpolation pixel, it is determined whether the variation of the pixel values has a periodicity or not. The periodicity is determined using the above described method of determining the size of the area and the method of determining the periodicity. Subsequently, at step 1315, it is determined which one of the areas the interpolation pixel actually belongs to. For this determination, the above described method of determining the boundary and the method of determining the size of the reference area are adopted. Then variances are individually obtained for the left and right reference areas, and the determination is made by determining whether the obtained variances for the left and right reference areas are greater than or equal to the threshold value. When the variances are greater than or equal to the threshold value, it is determined that the interpolation pixel exists in the periodic area.

Then, at step S1320, the interpolation method used for the interpolation pixel is determined. That is, the control unit 64 determines which one of the first pixel value generating unit 62, the second pixel value generating method 63, and the third pixel value generating unit 67 is to be adopted for generating the pixel value of the interpolation pixel, based on the determined results at step S1310 and step S1315. At next step S1325, it is determined whether the first pixel value generating unit 62 is adopted.

When it is determined, at step S1325, that the first pixel value generating unit 62 is adopted, the process proceeds to step S1330, and the pixel value of the interpolation pixel is generated by the interpolation method used by the first pixel value generating unit 62. Subsequently, at step S1335, the validity verification unit 66 verifies whether the pixel value generated by the first pixel value generating unit 62 is valid or not, and at step S1340, it is determined whether the pixel value is valid or not.

When it is determined, at step S1325, that the first pixel value generating unit 62 is not adopted, the process proceeds to step S1345, and it is determined whether the third pixel value generating unit 67 is adopted. When it is determined that the third pixel value generating unit 67 is adopted, the process proceeds to step S1350, and the pixel value of the interpolation pixel is generated by the interpolation method used by the third pixel value generating unit 67. Subsequently, at step S1355, the validity verification unit 66 verifies whether the pixel value generated by the third pixel value generating unit 67 is valid or not, and at step S1360, it is determined whether the pixel value is valid.

When it is determined, at step S1345, that the third pixel value generating unit 67 is not adopted, the process proceeds to step S1365, and the pixel value of the interpolation pixel is generated by the interpolation method used by the second pixel value generating unit 63. When it is determined, at step S1340, that the pixel value is not valid, the process proceeds to step S1350, and the pixel value of the interpolation pixel is generated by the interpolation method used by the third pixel value generating unit 67. Further, when it is determined, at step S1360, that the pixel value is not valid, the process proceeds to step S1365, and the pixel value is generated by the interpolation method used by the second pixel value generating unit 63.

When it is determined, at step S1340, that the pixel value is valid, or when it is determined, at step S1360, that the pixel value is valid, or when the pixel value is generated at step S1365, the process proceeds to step S1370, and the pixel value is input to the interpolation pixel detected at step S1305. Then the process proceeds to step S1375, and it is determined whether the interpolation for all the interpolation pixels is completed. When plural interpolation pixels have been detected at step S1305, it is determined whether the pixel values are input to all the interpolation pixels.

When it is determined, at step S1375, that the interpolation for all the interpolation pixels has been completed, the process proceeds to step S1380, and terminates this process. On the other hand, when it is determined that the interpolation is not completed, then the process returns to step S1305. Then the next interpolation pixel is set, the pixel value is generated, and the process to input the pixel value is performed.

According to the present invention, in addition to the above described image processing device and the image inspection method performed by the image processing device, a computer readable program for realizing the method can be provided. Here, the program can be stored in a recording medium such as a FD, a CD, a DVD, a SD card, and a USB memory, and the program can be provided as a recording medium in which the program has been recorded.

So far, the present invention is explained as the image processing device and the image inspection method through the above described embodiments. However, the present invention is not limited to the above described embodiments. The present invention can be modified within the scope in which the person skilled in the art can think of, such as another embodiment, an addition, a modification, and a deletion. It is considered that any embodiment is within the scope of the present invention, provided that the embodiment demonstrates the effect of the present invention.

The present application is based on Japanese Priority Application No. 2011-008653 filed on Jan. 19, 2011, the entire contents of which are hereby incorporated herein by reference.

The invention claimed is:

1. An image processing device that generates a pixel value of an interpolation pixel placed at a predetermined position and interpolates the interpolation pixel with the pixel value, the image processing device comprising a hardware processor that executes a program so as to implement:
a periodicity determining unit that determines whether an area including the interpolation pixel is a provisional periodic area based on whether a variation of values of pixels included in the area have periodicity through the area;
a boundary determining unit that defines, when the periodicity determining unit determines that the area is the provisional periodic area, a reference area at a position apart from the interpolation pixel by a predetermined pixel distance on a left, right, up, or down side of the interpolation pixel, and determines whether the interpolation pixel belongs to a periodic area or a non-periodic area by obtaining a variance of values of the pixels included in the reference area and determining that the interpolation pixel belongs to the periodic area when the variance is greater than or equal to a predetermined threshold value;
a first pixel value generating unit that generates a first pixel value of the interpolation pixel using a first interpolation method;
a second pixel value generating unit that generates a second pixel value of the interpolation pixel using a second interpolation method, the second interpolation method being different from the first interpolation method;
a control unit that determines whether the first pixel value generating unit is to be used to generate the first pixel value or the second pixel value generating unit is to be used to generate the second pixel value, based on a determination result of the periodicity determining unit and a determination result of the boundary determining unit; and
a pixel value inputting unit that inputs one of the first pixel value generated by the first pixel value generating unit and the second pixel value generated by the second pixel value generating unit to the interpolation pixel, the one of the first pixel value and the second pixel value being determined by the control unit.

2. The image processing device according to claim 1, wherein
the first interpolation method is a pattern matching method.

3. The image processing device according to claim 2, wherein
the second interpolation method is an internal interpolation method using a nearest-neighbor interpolation (zero-order interpolation), a linear interpolation (first-order interpolation), a parabolic interpolation (second-order interpolation), a cubic interpolation (third-order interpolation), a polynomial interpolation, a spline interpolation, a Lagrange interpolation, a bilinear interpolation, or a bicubic interpolation.

4. The image processing device according to claim 1, further comprising:
a validity verification unit that verifies whether an interpolation result of interpolating the interpolation pixel with one of the first pixel value and the second pixel value is valid; and
wherein, when the validity verification unit verifies a first interpolation result of interpolating the interpolation pixel with the first pixel value generated by the first pixel value generating unit and determines that the first interpolation result is not valid, the control unit causes the second pixel value generating unit to generate the second pixel value.

5. The image processing device according to claim 4, wherein the validity verification unit determines whether the first interpolation result is valid by determining whether a degree of dissimilarity between a pattern and a reference pattern including the interpolation pixel is less than a threshold value or by determining whether a degree of similarity between the pattern and the reference pattern is greater than or equal to the threshold value, wherein the pattern is a predetermined area within an image adopted by the first pixel value generating unit, when the first pixel value generating unit uses a pattern matching method as the first interpolation method to generate the first pixel value.

6. The image processing device according to claim 4, further comprising:
a third pixel value generating unit that generates a third pixel value of the interpolation pixel using a third interpolation method, the third interpolation method being different from the first interpolation method and the second interpolation method,
wherein, when the validity verification unit verifies the first interpolation result and determines that the first interpolation result is not valid, the control unit causes the third pixel value generating unit to generate the third pixel value.

7. The image processing device according to claim 6, wherein, when the validity verification unit verifies a third interpolation result of interpolating the interpolation pixel with the third pixel value generated by the third pixel value generating unit and determines that the third interpolation result is not valid, the control unit causes the second pixel value generating unit to generate the second pixel value.

8. The image processing device according to claim 1, further comprising:
a third pixel value generating unit that generates a third pixel value of the interpolation pixel using a third interpolation method, the third interpolation method being different from the first interpolation method and the second interpolation method,
wherein the control unit selects one of the first pixel value generating unit to generate the first pixel value, the second pixel value generating unit to generate the second pixel value, and the third pixel value generating unit to generate the third pixel value, based on a determination result of the periodicity determining unit and a determination result of the boundary determining unit.

9. The image processing device according to claim 6, wherein the first interpolation method is a two-dimensional template matching method, the second interpolation method is an internal interpolation method, and the third interpolation method is a one-dimensional template matching method.

10. A pixel interpolation method in which a pixel value of an interpolation pixel placed at a predetermined position is generated by an image processing device and the interpolation pixel is interpolated with the pixel value, the method comprising:
a periodicity determining step for determining whether an image area including the interpolation pixel is a provisional periodic area which includes based on whether a variation of values of pixels included in the area have periodicity through the area;
a boundary determining step for defining, when the periodicity determining step determines that the area is the provisional periodic area, a reference area at a position that are apart from the interpolation pixel by a predetermined pixel distance on a left, right, up, or down side of the interpolation pixel and determining whether the interpolation pixel belongs to a periodic area or a non-periodic area by obtaining a variance of values of the pixels included in the reference areas and determining that the interpolation pixel belongs to the periodic area when the variance is greater than or equal to a predetermined threshold value;
a determining step for determining, based on a determination result of the periodicity determining step and a determination result of the boundary determining step, whether a first pixel value generating unit is to be used to generate a first pixel value for the interpolation pixel or a second pixel value generating unit is to be used to generate a second pixel value for the interpolation pixel, wherein the first pixel value generating unit is included in the image processing device and generates the first pixel value for the interpolation pixel using a first interpolation method, and the second pixel value generating unit is included in the image processing device and generates the second pixel value for the interpolation pixel using a second interpolation method; and
an inputting step for inputting one of the first pixel value generated by the first pixel value generating unit and the second pixel value generated by the second pixel value generating unit to the pixel, the one of the first pixel value and the second pixel value being determined by the determining step.

11. The pixel interpolation method according to claim 10, wherein the first interpolation method is a pattern matching method.

12. The pixel interpolation method according to claim 11, wherein the second interpolation method is an internal interpolation method using a nearest-neighbor interpolation (zero-order interpolation), a linear interpolation (first-order interpolation), a parabolic interpolation (second-order interpolation), a cubic interpolation (third-order interpolation), a polynomial interpolation, a spline interpolation, a Lagrange interpolation, a bilinear interpolation, or a bicubic interpolation.

13. The pixel interpolation method according to claim 10, further comprising:
a validity verification step for verifying whether an interpolation result of interpolating the interpolation pixel with one of the first pixel value and the second pixel value is valid;
a second pixel value generating step for causing the second pixel value generating unit to generate the second pixel value, when the validity verification step determines that a first interpolation result of interpolating the interpolation pixel with the first pixel value generated by the first pixel value generating unit is not valid.

14. The pixel interpolation method according to claim 13, wherein the validity verification step determines whether the first interpolation result is valid by determining whether a degree of dissimilarity between a pattern and a reference pattern including the interpolation pixel is less than a threshold value, or by determining whether a degree of similarity between the pattern and the reference pattern is greater than or equal to the threshold value, wherein the pattern is a predetermined area within an image adopted by the first pixel value generating unit, when the first pixel value generating unit uses a pattern matching method as the first interpolation method to generate the first pixel value.

15. The pixel interpolation method according to claim 13, wherein the image processing device further includes a third pixel value generating unit configured to generate a third pixel value of the interpolation pixel using a third interpolation method, the third interpolation method being different from the first interpolation method and the second interpolation method, and
wherein the pixel interpolation method further includes a third pixel value generating step for causing the third pixel value generating unit to generate the third pixel value, when the validity verification step determines that the first interpolation result is not valid.

* * * * *